United States Patent
Watanabe

(10) Patent No.: US 8,047,489 B2
(45) Date of Patent: Nov. 1, 2011

(54) THIN DESIGN DISPLAY APPARATUS AND DISPLAY UNIT DETACHMENT METHOD

(75) Inventor: Takao Watanabe, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 847 days.

(21) Appl. No.: 10/540,944

(22) PCT Filed: Dec. 26, 2003

(86) PCT No.: PCT/JP03/17001
§ 371 (c)(1), (2), (4) Date: Jun. 29, 2005

(87) PCT Pub. No.: WO2004/064017
PCT Pub. Date: Jul. 29, 2004

(65) Prior Publication Data
US 2006/0168865 A1    Aug. 3, 2006

(30) Foreign Application Priority Data

Jan. 9, 2003   (JP) ................................ 2003-003755
Apr. 14, 2003  (JP) ................................ 2003-109211

(51) Int. Cl.
    *F16M 11/00*       (2006.01)
(52) U.S. Cl. ............... 248/292.14; 248/274.1; 248/918
(58) Field of Classification Search .......... 248/919–923, 248/274.1, 292.14; 361/681–683
See application file for complete search history.

(56) References Cited

U.S. PATENT DOCUMENTS

| | | | |
|---|---|---|---|
| 6,532,628 B2 | 3/1920 | Hough et al. | |
| 3,990,670 A | 11/1976 | Frechtman | |
| 4,669,694 A | 6/1987 | Malick | |
| 4,690,362 A * | 9/1987 | Helgeland | 248/404 |
| 5,077,551 A | 12/1991 | Saitou | |
| 5,611,513 A | 3/1997 | Rosen | |
| 5,812,368 A | 9/1998 | Chen et al. | |
| 6,343,006 B1 | 1/2002 | Moscovitch et al. | |
| 6,366,452 B1 | 4/2002 | Wang et al. | |
| 6,381,125 B1 * | 4/2002 | Mizoguchi et al. | 361/682 |
| 6,418,010 B1 | 7/2002 | Sawyer | |
| 6,727,961 B2 * | 4/2004 | Yang | 349/58 |

(Continued)

FOREIGN PATENT DOCUMENTS

CN            2465203 Y       12/2001

(Continued)

*Primary Examiner* — Terrell McKinnon
*Assistant Examiner* — Steven Marsh
(74) *Attorney, Agent, or Firm* — Birch, Stewart, Kolasch & Birch, LLP

(57) ABSTRACT

In order to provide a display monitor, such as a thin design television or the like, in which its display unit is easily attachable and detachable from the stand structure and can be easily carried about, and where the place of installation of the display unit is not limited, a stand type thin design television includes a display unit (1), a joint body (15), a pillar (25) and a stand base (29). The joint body (15) is attached to the display unit (1) while the joint body (15) is free to be attached to and removed from the pillar (25) that is fixed to the stand base (29). In the first usage mode in which the pillar (25) and the stand base (29) are used, the joint (15) is inserted into the pillar (25). In the second usage mode in which the pillar (25) and the stand base (29) are not used, the joint body (15) itself is used as a stand.

37 Claims, 23 Drawing Sheets

U.S. PATENT DOCUMENTS

| | | |
|---|---|---|
| 6,983,126 B1 | 1/2006 | Saalman |
| 7,014,154 B2 * | 3/2006 | Jeong et al. .................... 248/157 |
| 7,143,478 B2 | 12/2006 | Quijano |
| 7,150,440 B2 * | 12/2006 | Yuan ........................... 248/372.1 |
| 7,267,312 B2 | 9/2007 | Kang et al. |
| 7,389,963 B2 * | 6/2008 | Cho et al. ...................... 248/159 |
| 2002/0002759 A1 | 1/2002 | Kim |
| 2003/0001053 A1 | 1/2003 | Cho et al. |
| 2004/0084588 A1 | 5/2004 | Liu et al. |
| 2005/0077439 A1 | 4/2005 | Quijano |
| 2005/0192049 A1 | 9/2005 | Nunez |
| 2007/0108359 A1* | 5/2007 | Lee et al. ..................... 248/372.1 |
| 2007/0194182 A1* | 8/2007 | Lee ............................. 248/125.9 |
| 2008/0029661 A1 | 2/2008 | Chen |

FOREIGN PATENT DOCUMENTS

| | | |
|---|---|---|
| CN | 1332440 Y | 1/2002 |
| EP | 0 319 656 A1 | 6/1989 |
| EP | 1 420 202 A2 | 5/2004 |
| JP | 54-92718 U | 6/1979 |
| JP | 60-1924 A | 1/1985 |
| JP | 61-621 U | 1/1986 |
| JP | 05011707 A | 1/1993 |
| JP | 5-324123 A | 12/1993 |
| JP | 6-266472 A | 9/1994 |
| JP | 8-125949 A | 5/1996 |
| JP | 8-272310 A | 10/1996 |
| JP | 08-314386 | 11/1996 |
| JP | 9-6250 A | 1/1997 |
| JP | 9-127882 A | 5/1997 |
| JP | 10-254581 A | 9/1998 |
| JP | 11-3043 A | 1/1999 |
| JP | 11-184395 | 7/1999 |
| JP | 2000003138 A | 1/2000 |
| JP | 2000-56695 A | 2/2000 |
| JP | 2000-206901 A | 7/2000 |
| JP | 2000-241008 A | 9/2000 |
| JP | 2002-171461 | 6/2002 |
| JP | 2002-311852 | 10/2002 |
| JP | 2003-44166 A | 2/2003 |
| KR | 2002-0027798 A | 4/2002 |
| WO | WO-02/073994 A1 | 9/2002 |

* cited by examiner (a)

(b)

THIN DESIGN DISPLAY APPARATUS AND DISPLAY UNIT DETACHMENT METHOD

TECHNICAL FIELD

The present invention relates to a thin design display apparatus that can be used in various usage modes and a display unit detachment method.

BACKGROUND ART

Conventional television using cathode ray tube have been used resting on a TV-mounting rack or case that is able to bear the weight of the television set, in order to support the TV screen at a predetermined height that meets the level and direction of the viewer's viewpoint.

Recently the use of thin design televisions using liquid crystal displays, plasma displays and the like has become widespread instead of CRT type displays. In the case of a CRT television, in order to keep it at a predetermined height, taking into account the ease of watching, it is necessary to use a steady TV-mounting rack, case, table or the like because of its heavy weight. On the other hand, since the thin design television is provided as a light-weight configuration as it becomes thin, it is possible to use a leg-like stand for supporting the thin design television similar to the stand for a fluorescent lamp, for example, instead of the conventional TV-mounting rack, case, table and the like. This configuration has the advantage of reducing the area for placement (see the patent literature 1, for example).

Also, the development into a thin and lightweight configuration promotes ease of relocation: for example, a system made up of a battery driven monitor unit and a base unit for transmitting video information to the monitor unit is disclosed in a patent literature 2 and others, in which the battery for driving the monitor unit is chargeable and the monitor unit can also be used during charging.

In this patent literature 2, the monitor unit is constructed such that the battery and a retractable stand are arranged on the backside while a groove with a charging terminal is formed at the bottom face. Additionally, in the base unit a charging terminal is formed in a holding rail, and when the battery is charged, the monitor unit with the stand housed into its stand housing slot is stood against the front of the base station so as to bring the charging terminals into contact with each other to allow for charging of the battery.

Further, as the stand having a grip handle for carriage, a stand similar to that used for an electric fan, for example, can be used, this also provides the advantage of reducing the area of placement.

FIGS. 27 to 30 show a conventional stand type thin design television (using a liquid crystal display) with a grip handle. This conventional stand type thin design television comprises a main boy 101 having a display screen and the like, a pillar 102, a stand base 103 and a joint body 104.

FIG. 28 is a side view showing one step for assembly of the stand type thin design television, wherein main body 101 and joint body 104 are integrated with screws etc., and pillar 102 and stand base 103 are also integrated with screws etc., then joint body 104 and pillar 102 are fitted to each other so that joint body 104 will be fixed and fastened so as to be rotatable with respect to pillar 102.

Referring to FIG. 29, the fitting between the joint body 104 and pillar 102 will be described in detail.

FIG. 29 is a side view showing the parts before these elements are fitted, in particular showing a cutaway representation of the fitting portion. As shown in FIG. 29, joint body 104 has a fitting part 105 at the fitting portion while pillar 102 has a fitting socket part 106 at the fitting portion. These parts 105 and 106 are attached in an integrated manner to joint body 104 and pillar 102, respectively. Fitting part 105 and fitting socket part 106 are formed so as to rotatably engage each other. Fitting part 105 is also formed with a slot 108 that screw fits a bolt 107. Formed at the bottom of fitting socket part 106 is a hole that allows bolt 107 to pass therethrough in the axial direction.

For attachment between joint body 104 and pillar 102, fitting part 105 of joint body 104 is fitted first into fitting socket part 106 of pillar 102. It should be added that pillar 102 and stand base 103 are hollow, forming a connected interior space in these elements. As shown in FIG. 29, bolt 107 is inserted from the bottom of stand base 103, passed through fitting socket part 106 and screwed into slot 108 of fitting metal 105, whereby fitting part 105 and fitting socket part 106 are secured and fixed so as to be rotatable on the same axis. Thus, attachment between joint body 104 and pillar 102 in the above way makes the display screen of main body 101 rotatable and adjustable for horizontally direction with respect to stand pillar 102 while rotation of a rotational axis 104a of joint body 104 makes the display screen of main body 101 adjustable for angle of elevation.

[Patent Literature 1]
 Japanese Patent Application Laid-open 2002-311852
[Patent Literature 2]
 Japanese Patent Application Laid-open 2002-171461

It is true that the development of thin design televisions into thin and lightweight configurations enables easy carrying indoors and in other locations, but since, upon practical carriage, the monitor unit described in the patent literature 1 is carried about by grasping the stand portion, or the above-described stand type thin design television with the grip handle is transported by carrying main body 101 to stand base 103 as a whole, transportation still entails trouble when the apparatus is transported to a place, for example, the top of a table or the like, where pillar 102 is no longer necessary for matching its height to that of viewer's viewpoint or to a narrow mounting space where stand base 103 is a hindrance. Therefore, there have been demands for more versatile thin design televisions, which are less limited by the installation place.

In the system of the monitor unit and base unit disclosed in patent literature 2, it is impossible to adjust the angle of the display screen when the monitor is mounted on the base unit, and if an angular adjusting function with respect to the angle of elevation and in the horizontal plane is devised, it needs a complex structure.

The present invention has been devised in order to solve the above problems, it is therefore an object of the present invention to provide an easy-to-use thin design display apparatus, whereby its display unit is easily attachable and detachable from the stand structure and can be easily carried about, the place of installation of the display unit is not limited, the angle of elevation and the horizontal angle of the display screen can be adjusted when the display is set on the stand structure, and the display unit can be used in a wall-mounted position.

DISCLOSURE OF INVENTION

In order to achieve the above object, the present invention has the following configurations.

The first aspect of the present invention is a thin design display apparatus comprising: a thin type display unit having a removable fitting part; and a stand/pillar structure having an insert space, wherein the thin type display unit is supported by the stand/pillar structure, by inserting the removable fitting part into the insert space; the display unit incorporates a battery; the removable fitting part is specified to have such an insert direction length that the supported state can be established when the removable fitting part is inserted into the stand/pillar structure; and, the removable fitting part of the display unit can be pulled out from the stand/pillar structure.

According to the first aspect of the present invention, by providing a configuration which eases insertion and removal of the display unit with respect to the stand/pillar structure that stably supports the display unit, it is possible to make more efficient use of the mobility of the display unit, which is imparted as a result of a thin configuration with provision of a power source, by making its carriage easy.

The second aspect of the present invention is characterized in that a grip handle which can be gripped is provided.

According to the second aspect of the present invention, it is possible to facilitate the display unit to be carried about.

The third aspect of the present invention is characterized in that the stand/pillar structure has an insertion guide means for guiding the insertion of the removable fitting part when the removable fitting part is inserted into the insert space.

According to the third aspect of the present invention, it is possible to perform smooth insertion and removal of the removable fitting part with respect to the stand/pillar structure. At the same time it is also possible to prevent accidents such as falling over of the apparatus due to loss of balance which would be caused if the removable fitting part is inserted into stand/pillar structure in a wrong position.

The fourth aspect of the present invention is characterized in that a cushioning member that abuts the removable fitting part when the display unit is supported by the stand/pillar structure so as to prevent the removable fitting part from swaying is provided inside the insert space of the stand/pillar structure.

According to the fourth aspect of the present invention, it is possible to prevent backlash of the stand-cum-joint in the stand/pillar structure. At the same time it is possible to prevent damage to the removable fitting part when the removable fitting part is inserted into the stand/pillar structure, hence make the removable fitting part undergo repeated actions of insertion and removal with respect to the stand/pillar structure.

The fifth aspect of the present invention is characterized in that a front end of the removable fitting part with respect to an insertional direction is formed with an elastic member while an elastic member is arranged inside the insert space of the stand/pillar structure, in the vicinity opposing a front end of the removable fitting part when the display unit is supported by the stand/pillar structure.

According to the fifth aspect of the present invention, it is possible to enhance the stability of the display unit relative to the stand/pillar structure by preventing backlash of the removable fitting part in the stand/pillar structure when the display unit is supported by the stand/pillar structure. At the same time it is possible to prevent damage to the removable fitting part when the removable fitting part is inserted into the stand/pillar structure, hence make the stand-cum-joint undergo repeated actions of insertion and removal with respect to the stand/pillar structure.

The sixth aspect of the present invention is a thin design display apparatus comprising: a thin type display unit having a removable fitting part; and a stand/pillar structure having an insert space, wherein the thin type display unit is supported by the stand/pillar structure, by inserting the removable fitting part into the insert space; the display unit includes a grip handle; the stand/pillar structure includes an anti removal device for preventing removal of the removable fitting part and a removal prevention releasing device for canceling the anti removal device; and the removal prevention releasing device releases removal prevention of the removable fitting part by a force acting in the same direction as the removable fitting part is inserted into the stand/pillar structure.

According to the sixth aspect of the present invention, provision of the device protecting removal of the display unit in the stand/pillar structure for stably supporting the display unit further enhances the stable use. Further, the anti removal means is constructed so that removal prevention of the removable fitting part will be cancelled by acting force in the same direction as the removable fitting part is inserted into the stand/pillar structure. Therefore, it is possible to pull out the display unit easily and safely while holding the stand/pillar structure steadily by the force opposing the direction in which the handle is pulled up. Thus, it is possible to make the function of carrying the thin type display unit more efficient.

The seventh aspect of the present invention is characterized in that a thin type display unit having a grip handle and a removable fitting part is supported by a stand/pillar structure, by inserting the removable fitting part into an insert space of the stand/pillar structure, and removal of the removable fitting part is prevented by an anti removal device, comprising the steps of: pulling up the grip handle so as to cause a force to act in the direction in which the removable fitting part is separated from the stand/pillar structure, and acting a force on the anti removal device, at the same time, in the same direction as the removable fitting part is inserted into the stand/pillar structure, so as to detach the removable fitting part of the display unit from the stand/pillar structure.

According to the seventh aspect of the present invention, since the direction of the force for lifting the grip handle is opposite to the direction of the force for releasing removal prevention of the anti removal means, it is possible to pull out the display unit easily and safely, whereby the function of carrying the thin type display unit can be made more efficient.

The eighth aspect of the present invention is a thin design display apparatus comprising: a thin type display unit having a stand-cum-joint; and a stand/pillar structure having an insert space, wherein the thin type display unit is supported by the stand/pillar structure, by inserting the stand-cum-joint into the insert space; the display apparatus can be used in a first usage mode in which the display unit is supported by the stand/pillar structure; and the display apparatus can be used in a second usage mode in which the stand-cum-joint of the display unit is pulled out from the stand/pillar structure and used as a stand for supporting the display unit.

According to the eighth aspect of the present invention, in the first usage mode the display unit can be used stably by supporting it with the stand/pillar structure. In the second usage mode the display can be set at another location without taking into account the space for stand/pillar structure, hence providing comfort when watching.

The ninth aspect of the present invention is characterized in that a backside of the display unit and one end of the stand-cum-joint are connected by a rotational part that makes them rotatable.

According to the ninth aspect of the present invention, it is possible to adjust the angle of elevation and depression of the display unit when the display is used in either the first or second usage mode.

The tenth aspect of the present invention is characterized in that a grip handle that can be gripped is provided.

According to the tenth aspect of the present invention, it is possible to make carriage of the display unit easy.

The eleventh aspect of the present invention is characterized in that a rotational axis of the rotational part extends parallel to a width direction of the display unit, and the stand-cum-joint is rotatable about the rotational axis from a position where a distal end is located on a bottom side of the display unit to a position where the distal end is located on a top side.

According to the eleventh aspect of the present invention, it is possible to avoid the stand-cum-joint being exposed beyond the outer frame. Further, adjustment of the angle of the stand-cum-joint makes it possible to control the angle of elevation of the display unit.

The twelfth aspect of the present invention is characterized in that the display unit incorporates the battery in a lower side.

According to the twelfth aspect of the present invention, disposition of a heavy battery at the bottom of the display unit enhances the stability of the orientation and placement of the display unit. In particular, improved stability can be obtained in the second usage mode. Further, it is also convenient in a configuration where the battery is replaced by rotating the unit upside down while the display unit is set on the stand pillar. This feature is particularly advantageous when a battery into which battery liquid should be charged, such as a fuel cell is used.

The thirteenth aspect of the present invention is characterized by inclusion of an elevation angle restraining means which defines different permissible ranges of an angle of elevation of the display unit relative to the stand-cum-joint, between that in the first usage mode and that in the second usage mode.

According to the thirteenth aspect of the present invention, it is possible to prevent the stand-cum-joint from being inserted into the stand/pillar structure when the display unit is in an unstable position, providing a guide for safe operation. It is also possible to prevent the display unit in the first usage mode from being inclined to an unstable angle of elevation, hence making it possible to secure the balance of the display unit in the first usage mode.

The fourteenth aspect of the present invention is characterized by inclusion of an indicating means for informing a user of a fact that a pivot angle between the display unit and the stand-cum-joint is set at a recommended angle of elevation.

According to the fourteenth aspect of the present invention, since rotation of the stand joint is left up to the user's operation, if there is a certain stable range for the apparatus and control depending on the range of rotation of the stand joint, for example, when used in the second usage mode or when usage is switched from the second usage mode to the first usage mode, the user may feel uneasy when operating the stand joint. However, the indicating means is able to inform the user of the recommended stable positions, for example, hence can make the user feel safe and give the user correct operation guidance.

The fifteenth aspect of the present invention is characterized in that the stand-cum-joint projects down below a bottom side of the display unit when a distal end of the stand-cum-joint is set at a downmost position on the bottom side of the display unit.

According to the fifteenth aspect of the present invention, since the stand-cum-joint is specified to have such a length as to project below the bottom of the thin type display unit, it is possible to take a large angle when the display unit is supported with the stand-cum-joint, hence support the display in a stable manner.

The sixteenth aspect of the present invention is characterized in that a cross section of a distal end of the stand-cum-joint is an elongate shape which is longer in a direction of a rotational axis than in a direction perpendicular to the rotational axis.

According to the sixteenth aspect of the present invention, in the second mode where the stand-cum-joint is used as the stand for supporting the display unit, an improved stably can be secured because a greater area can be put in direct contact with the ground.

The seventeenth aspect of the present invention is characterized in that a cross section of the stand-cum-joint and the insert space of the stand-cum-joint are circular.

According to the seventeenth aspect of the present invention, in the first usage mode, the horizontal angle of the display unit can be adjusted by rotating the display unit horizontally.

The eighteenth aspect of the present invention is characterized in that the stand-cum-joint includes an anti removal device for preventing removal of the removable fitting part and a removal prevention releasing device for releasing the anti removal device.

According to the eighteenth aspect of the present invention, either the carriage of the display unit and the stand/pillar structure as a whole as in the first usage mode, or the carriage of the display unit only separated from the stand/pillar structure, can be freely selected, hence it is possible to enhance the flexibility of carrying. It is also possible to prevent separation of the display unit from the stand/pillar structure in the first usage mode, hence prevent breakage of the display unit. It is also possible to enhance safety.

The nineteenth aspect of the present invention is characterized in that the stand-cum-joint includes an insert guide means for guiding the stand-cum-joint when the stand-cum-joint is inserted into the insert space.

According to the nineteenth aspect of the present invention, it is possible to perform smooth insertion and removal of the stand-cum-joint with respect to the stand/pillar structure. At the same time it is also possible to prevent accidents such as falling over of the apparatus due to loss of balance which would be caused if the stand-cum-joint is inserted into stand/pillar structure in a wrong direction.

The twentieth aspect of the present invention is characterized in that a cushioning member that abuts the stand-cum-joint so as to prevent the stand-cum-joint from swaying in the first usage mode is provided inside the insert space of the stand/pillar structure.

According to the twentieth aspect of the present invention, it is possible to prevent backlash of the stand-cum-joint in the stand/pillar structure. At the same time it is possible to prevent damage to the stand-cum-joint when the stand-cum-joint is inserted into the stand/pillar structure, hence make the stand-cum-joint undergo repeated actions of insertion and removal with respect to the stand/pillar structure.

The twenty-first aspect of the present invention is characterized in that the distal end of the stand-cum-joint is formed with an elastic member while an elastic member is arranged inside the insert space of the stand/pillar structure, in the vicinity opposing the distal end of the stand-cum-joint in the first usage mode.

According to the twenty-first aspect of the present invention, it is possible to enhance the stability of the display unit relative to the stand/pillar structure by preventing backlash of the stand-cum-joint in the stand/pillar structure when it is used in the first mode. At the same time it is possible to prevent damage to the stand-cum-joint when the stand-cum-joint is inserted into the stand/pillar structure, hence make the stand-cum-joint undergo repeated actions of insertion and removal with respect to the stand/pillar structure.

The twenty-second aspect of the present invention is characterized in that the grip handle has a fixture portion to be fixed to the display unit and a remote controller holder formed in such a shape that a remote controller for remote controlling the display unit fits therein.

According to the twenty-second aspect of the present invention, since the remote controller is accommodated in the grip handle which is produced separately from the display unit, it is possible to achieve easy manufacturing and reduction in manufacture cost.

The twenty-third aspect of the present invention is characterized in that the grip handle and the stand-cum-joint are formed integrally as a joined structure that can be connected to the display unit.

According to the twenty-third aspect of the present invention, since the grip handle and the stand-cum-joint as the necessary components of the display unit are integrally formed, it is possible to achieve easy manufacturing and reduction in manufacture cost.

The twenty-fourth aspect of the present invention is characterized in that the stand/pillar structure includes a stand base portion formed so as to be placed in contact with a flat plane and a pillar portion provided upright on the stand base portion, having the insert space; and the pillar portion is able to be rotatable relative to the stand base about an axis that is perpendicular to the flat plane.

According to the twenty-fourth aspect of the present invention, the display unit is permitted to pivot horizontally even though the cross section of the stand-cum-joint is not circular.

The twenty-fifth aspect of the present invention is a thin type display device comprising: a thin type display unit having an engaging portion capable of being engaged with a projection projected from a wall surface; and an angle adjuster whose one end is connected to a backside of the display unit by means of a rotatable rotational part, wherein the engaging portion is projected above a top side of the display unit.

According to the twenty-fifth aspect of the present invention, since the display unit, which is imparted with mobility by development into a thin configuration and provision of a power source unit, has an engaging portion capable of being engaged with a projection projected from a wall surface, it is possible to watch television on the wall-mounted display. In addition, the position of the engaging portion projected above the top side of the display further facilitates its mounting to the wall. Further, since the present invention includes an angle adjuster, the angle of the display unit can be adjusted when the display unit is used in a wall-mounted position. This makes the display unit more convenient as a wall-mounted television.

The twenty-sixth aspect of the present invention is a thin design display apparatus comprising: a thin type display unit having an engaging portion capable of being engaged with a projection projected from a wall surface; and an angle adjuster whose one end is connected to a backside of the display unit by means of a rotatable rotational part, wherein the engaging portion extending toward a distal end from a fixed end, fixed to the display unit has an inclination in a depth direction of the display unit, and a depth of the inclination is equal to or greater than a depth dimension of the rotational part.

According to the twenty-sixth aspect of the present invention, when the display is used in a wall-mounted position by engagement of the grip handle of the display unit with the engaging portion or the like on the wall surface, the display can be set parallel to, or with a certain angle of depression, to the wall surface even if the hook etc., on the wall surface is short. Therefore, the screen is easy to see from the front or from obliquely below, so that the display is preferably used in a wall-mounted position. Further, since the angle adjuster provided on the backside of the display makes adjustment of both the angle of depression and the angle of elevation possible, the display can be set so as to provide ease of view not only from obliquely below but also from obliquely above, hence it is possible to set the display at any angle when it is used in a wall-mounted position.

The twenty-seventh aspect of the present invention is characterized in that the grip handle is an annular configuration.

According to the twenty-seventh aspect of the present invention, an annular configuration of the grip handle permits the stable use of the display when it is wall mounted in the second usage mode.

The twenty-eighth aspect of the present invention is a thin design display apparatus comprising: a thin type display unit having a grip handle; and a stand-cum-angle adjuster whose one end is connected to a backside of the display unit by means of a rotatable rotational part, wherein the grip handle is arranged with its distal end projected above a top side of the display unit and extends from a fixed end fixed to the display unit to the distal end so as to have an inclination in a depth direction of the display unit; a depth of the inclination is equal to or greater than the depth dimension of the rotational part; the display apparatus can be used in a first usage mode in which the stand-cum-angle adjuster is used as a stand for supporting the display unit; and the display apparatus can be used in a second usage mode in which the grip handle is engaged with a projection projected from a wall surface.

According to the twenty-eighth aspect of the present invention, the display unit can be used on the top of a table by supporting it with the stand-cum-angle adjuster. The grip handle for carriage, provided for the display unit can also be used as an engaging portion to be engaged with a projection projected from a wall surface so that the display can be used in a wall-mounted position. Thus, it is possible to make more efficient use of the mobility of the display unit, which is imparted as a result of a thin configuration with provision of the power source.

The twenty-ninth aspect of the present invention is characterized in that the stand-cum-angle adjuster projects down below a bottom side of the display unit when the distal end of the stand-cum-angle adjuster is set at a downmost position on the bottom side of the display unit.

According to the twenty-ninth aspect of the present invention, when the stand-cum-angle adjuster is used as a stand for supporting the display in the first usage mode, the display unit can be stably supported and the supported angle of the display unit can also be secured.

The thirtieth aspect of the present invention is characterized in that the distal end of the stand-cum-angle adjuster is an elongate shape which is longer in a direction of a rotational axis than in the direction perpendicular to the rotational axis.

According to the thirtieth aspect of the present invention, since a greater area of the stand-cum-angle adjuster can be put in contact with the ground, the stability of the display unit, especially against the inclination to the left or right, can be enhanced when the display unit is supported by the stand-cum-angle adjuster.

The thirty-first aspect of the present invention is a thin design display apparatus comprising: a thin type display unit having a grip handle; and a stand-cum-joint whose one end is connected to a backside of the display unit by means of a rotatable rotational part, wherein the display unit is supported by inserting the stand-cum-joint into an insert space of the stand/pillar structure; the display apparatus can be used in a first usage mode in which the display unit is supported; the display apparatus can be used in a second usage mode in which the stand-cum-joint of the display unit is pulled out from the stand/pillar structure and used as a stand for supporting the display unit; and the display apparatus can be used in a third usage mode in which the stand-cum-joint of the display unit is pulled out from the stand/pillar structure and the grip handle is engaged with a projection projected from a wall surface.

According to the thirty-first aspect of the present invention, in the first usage mode the display unit can be used stably by supporting it with the stand/pillar structure. In the second usage mode the display can be set at another location without taking into account the space for stand/pillar structure, and adjustment of the angle of elevation also provides comfort in watching. Further, in the third usage mode, the display unit can be used as a wall-mounted display. In this way, the display unit can be used in a variety of situations.

The thirty-second aspect of the present invention is a thin design display apparatus comprising: a thin type display unit; a stand structure whose one end is connected to a backside of the display unit by means of a rotatable rotational part; and an indicating means for informing a user that an angle between the stand structure and the display unit has been set at a recommended elevation angle as a result of rotation of the stand structure.

According to the thirty-second aspect of the present invention, it is possible to provide a user-friendly apparatus such that the indicating means is able inform the user of the appropriate, stable positions free from falling, etc., when the stand structure is rotated, hence it is possible to prevent the apparatus from falling over or being handled forcibly.

The thirty-third aspect of the present invention is characterized in that the display unit has a remote controller holder formed in such a shape that a remote controller for remote controlling display of the display unit fits therein.

According to the thirty-third aspect of the present invention, since the display unit has the holder, it is possible to prevent the remote controller from being left behind or from being lost even if the display unit is carried about place to place. Thus, it is possible to make more efficient use of the mobility of the display unit, which is imparted as a result of a thin configuration with provision of a power source.

The thirty-fourth aspect of the present invention is characterized by inclusion of a pair of semicircular speaker portions on the left and right of the display unit.

According to the thirty-fourth aspect of the present invention, since the annular shape of the grip handle is formed similar to the speakers, projecting above the display unit when viewed from the front of the display, this arrangement provides balance of the external and also enhances strength by virtue of its curvature.

The thirty-fifth aspect of the present invention is a thin design display apparatus comprising: a thin type display unit having a grip handle; a power supply unit capable of supplying electric power to the display unit; and a remote controller holder formed in such a shape that a remote controller for remote controlling the display unit fits therein.

According to the thirty-fifth aspect of the present invention, the remote controller, which is used together with a display, can be carried about integrally with the display unit that is imparted with mobility as a result of development into a thin configuration and provision of a power source unit, hence it is possible to obtain lots of advantages such as prevention against loss of the remote controller.

The thirty-sixth aspect of the present invention is characterized in that the remote controller has a configuration that tapers from one end to the other while the remote controller holder has a inclined configuration that tapers from a top to a bottom of the display unit.

According to the thirty-sixth aspect of the present invention, the configurations of the remote controller and remote controller holder as above enables easy attachment and detachment of the remote controller with respect to the display unit. As a result it is possible to enhance the mobility of the display unit.

The thirty-seventh aspect of the present invention is a thin design display apparatus comprising: a thin type display unit having a removable fitting part; and a stand/pillar structure having an insert space, wherein the thin type display unit is supported by the stand/pillar structure, by inserting the removable fitting part into the insert space; the removable fitting part of the display unit can be pulled out from the stand/pillar structure; the display unit incorporates a chargeable battery; the stand/pillar structure has a power supply unit; and the chargeable battery incorporated in the display unit is charged through the power supply unit when the display unit is supported by the stand/pillar structure.

According to the thirty-seventh aspect of the present invention, when the display unit is supported by the stand/pillar structure, the display unit can be used for display while charging. When the display unit is carried about by pulling out the removable fitting part of the display, the display unit can be used for display via the chargeable battery at another location. Thus, this configuration not only permits easy carriage of the display unit but also enables charging of the chargeable battery while the display unit is set on the stand/pillar structure and used for display.

BEST MODE FOR CARRYING OUT THE INVENTION

The First Embodiment

The first embodiment of the present invention will be described in detail with reference to the drawings.

Figure 1:
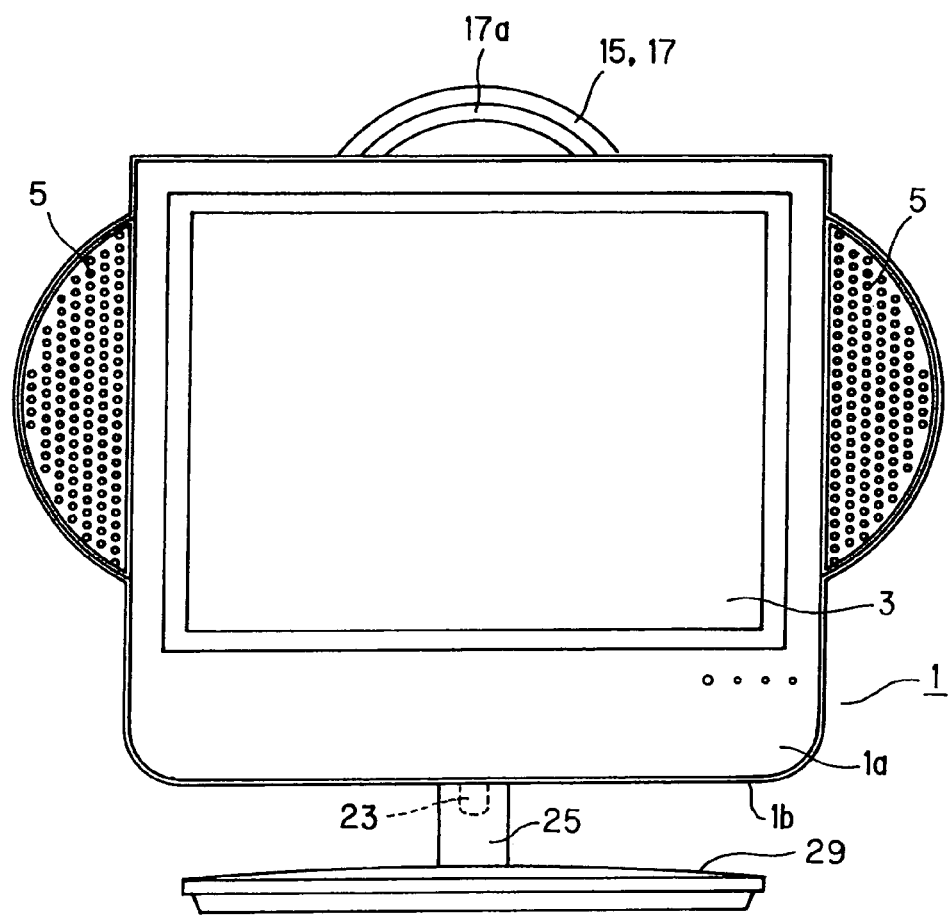
FIG. 1 is a front view showing the first usage mode of a stand type thin design television according to the first embodiment of the present invention.

FIG. 1 is a front view of a stand type thin design television according to the present embodiment. Here, the embodiment is described taking an example of a liquid crystal display as a display unit 1 for displaying information such as video, images and the like. However, various kinds of thin type display devices such as plasma displays, organic EL (electro luminescence) and others can also be employed.

The stand type thin design television includes a display unit 1, a joint body 15, a stand/pillar structure 30 composed of a pillar 25 and a stand base 29. Joint body 15 is constructed such that it is attached to display unit 1 and also attached detachably to pillar 25 fixed to stand base 29, and in the first usage mode where stand/pillar structure 30 is used, joint body 15 is fitted into pillar 25 so that stand/pillar structure 30 supports display unit 1 while in the second usage mode where stand/pillar structure 30 is not used, joint body 15 itself is used as a supporting stand for supporting display unit 1.

Since joint body 15 and pillar 25 can be joined to and separated from each other as above, it is possible to easily change mode between the first and second usage modes. Since joint body 15 is formed so as to be also usable as a stand, switch between the first and second usage modes can be realized with a simple configuration. Next, each component will be described in detail.

[Display Unit]

To begin with, display unit 1 will be described with reference to FIGS. 1 to 3.

Display unit 1 includes: an approximately rectangular front frame 1a; a liquid crystal display 3 for displaying video, images, etc., in the front frame 1; speakers 5 for sound output; a backside cover 7 (FIG. 2); a TV tuner 9 (FIG. 2) provided inside; a detachable chargeable battery 11 for power supply (FIG. 2); and a base rail 13 (FIG. 2) formed at the bottom. Display unit 1 can be driven by either battery 11 or an unillustrated a.c., power supply.

Liquid crystal display 3 is able to display video (including video and image from TV phones) received by TV tuner 9; video and image (including motion pictures, still pictures) recorded on and read out from recording media such as, for example, disk media including DVD, MD, CD, FD and the like and semiconductor memories; and information such as video, images, text, code, etc., from the internet.

Speakers 5 are arranged on both the left and right sides at upper positions of front frame 1a and shaped in semicircular forms similar to the shape of an aftermentioned handle 17 of joint body 15, which looks arch-like (annular) above front frame 1a, providing balance and stylishness from a design viewpoint and also enhancing strength by virtue of its curvature. It is preferred that an antenna unit is disposed at a position as far to the outside as possible for good reception when display unit 1 is set away from the home position. In the case of the present embodiment, it is considered that the antenna unit can be incorporated in speakers 5 which stick out from display unit 1. Further, since display unit 1 is suitable for carriage, it may bang against walls etc., during carrying; in such a case, being circular better alleviates impacts than being rectangular.

Figure 2:
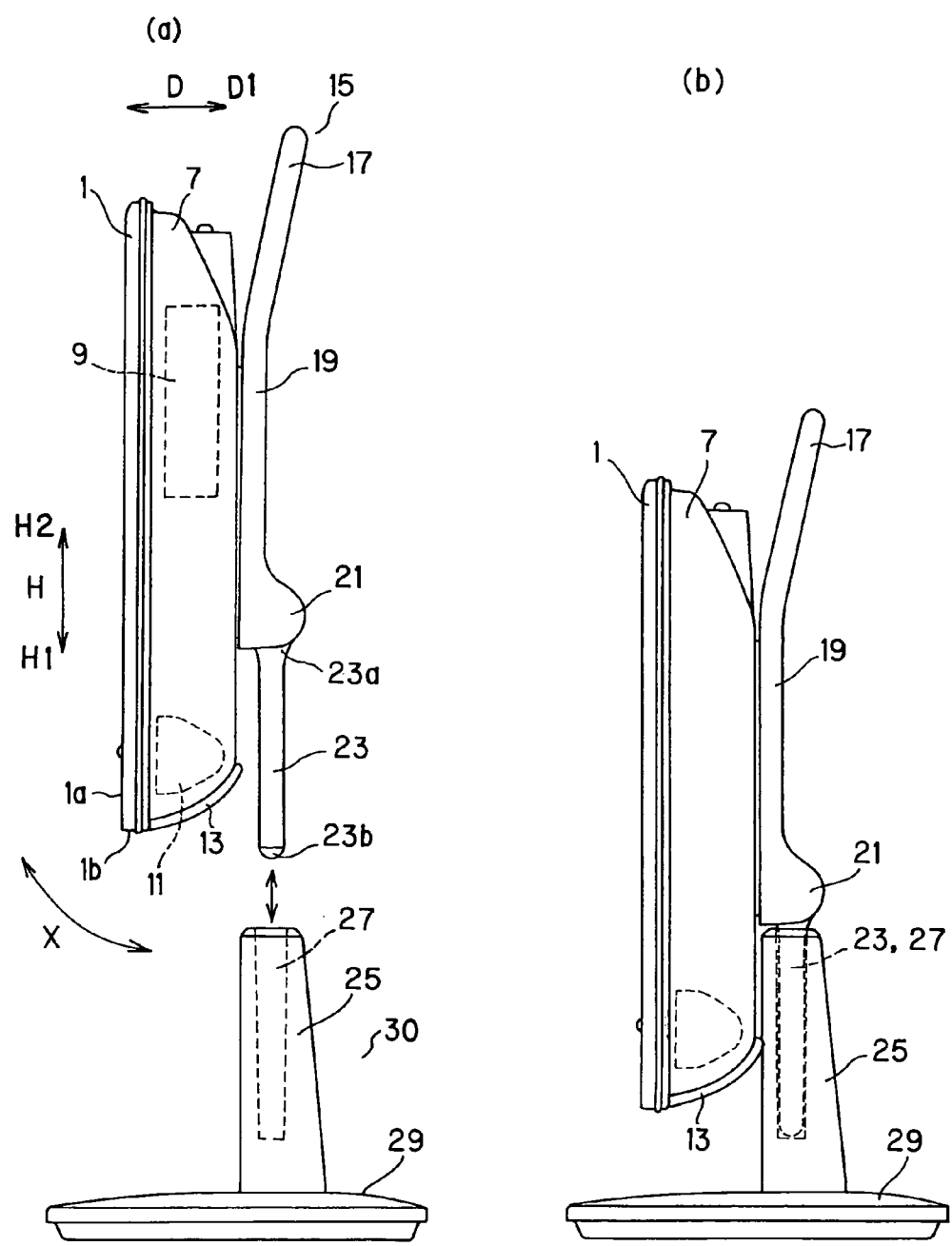
FIG. 2 is a side view of the stand type thin design television according to the first embodiment of the present invention, (a) showing a state where a display unit 1 is separated from a pillar 25, (b) showing a state where display unit 1 and pillar 25 are joined.
Figure 3:
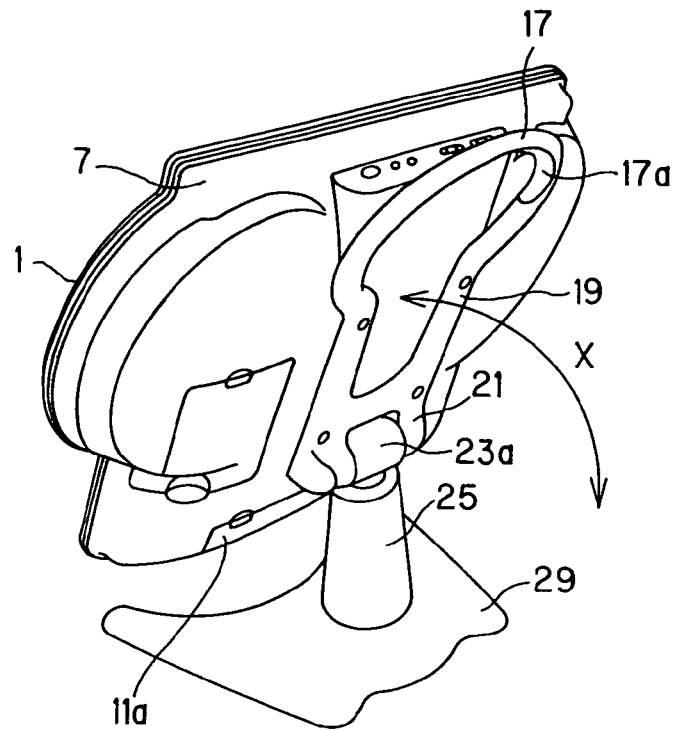
FIG. 3 is a perspective operational illustrative view showing the backside of the stand type thin design television according to the first embodiment of the present invention.

Battery (chargeable cell) 11 (FIG. 2) is disposed in the lower part of display unit 1 (at the side closer to stand base 29), is set and unset by opening door 11a provided in the lower part of backside cover 7 as shown in FIG. 3. Disposition of a heavy part, i.e., battery 11, at the lower part of display unit 1 enhances the stability of the orientation and placement of display unit 1. Here, provision of a power unit such as the battery etc., in display unit 1 contributes to mobility of display unit 1; provision of a power supply plug, etc., as another power supply means in the display portion enables power supply by plugging it into a socket outlet in order to obtain electricity from a powerline source at a remote site, contributing to mobility. When a plurality of power supply methods such as battery, power supply plug, etc., are provided, display unit 1 becomes more versatile, specifically it may be driven by the battery at the remote site while, where there is a socket outlet, it may be power supplied stably through the power supply plug and also the battery can be charged.

Base rail 13 functions as a rail for placement of display unit 1 when display unit 1 is separated from stand/pillar structure 30 and is provided in the bottom face of display unit 1 (on the side close to stand base 29). This can be formed of a material having a non-skid effect, such as rubber, silicone, and the like. The rail is formed in a curved (approximately arced) rail-like (projected) form (having a center on the display unit side 1) with a length that permits appropriate setting even if the angle of elevation of display unit 1 is changed. Base rail 13 can be provided with a predetermined length at the bottom of display unit 1, at one or more places so as to present the above operational effect. When a plurality of rails each having a narrower width are provided in parallel to each other, it is possible to realize the aforementioned operational effect even with a lower amount of material.

[Joint Body 15]

Next, joint body 15 will be described with reference to FIGS. 1 to 3.

Joint body 15 has a ring-like form, including a grip handle 17, a fixing portion 19 to be fixed to backside cover 7 of the display unit 1, an approximately bar-shaped stand-cum-joint 23, and a first pivot 21 for joining the stand-cum-joint 23 with display unit 1 in a rotatable manner.

In the first usage mode, stand-cum-joint 23 is inserted into an insert space 27 of stand/pillar structure 30 and functions as a joint for joining display unit 1 and stand/pillar structure 30. In the second usage mode, stand-cum-joint 23 functions as a stand for supporting display unit 1. Stand-cum-joint 23 also functions as a removable fitting part which is inserted to and removed from stand/pillar structure 30 to change usage mode between the first usage mode and the second usage mode.

Grip handle 17 has an arched (annular) form having a non-skid member 17a made of non-skid rubber, silicone, and the like formed in an arc on the inner side thereof (FIG. 1).

Figure 6:
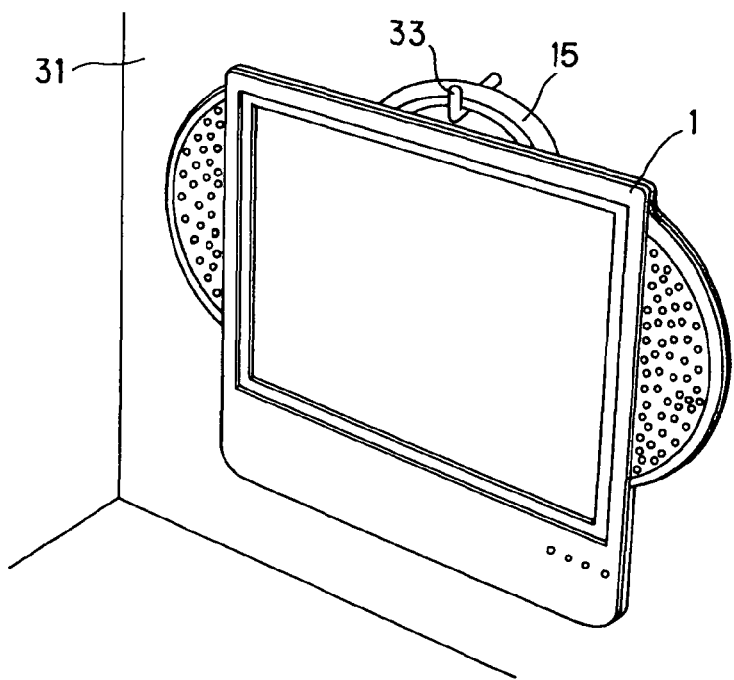
FIG. 6 is a perspective view of the stand type thin design television when display unit 1 is wall mounted, according to the first embodiment of the present invention.

Grip handle 17 also plays the roles of a structure that can be engaged with a projection, e.g., a hook 33, formed on a wall 31 etc., as shown in FIG. 6. Since the thickness of first pivot 21 or stand-cum-joint 23 (in the front frame 1a-backside cover 7 direction D) is greater than that of the fixing portion 19, grip handle 17 is formed so as to extend obliquely in the thickness direction D of display unit 1, in the direction away from fixing 19, or to the depth direction D1 of display unit 1, as shown in FIG. 2. More specifically, with respect to the thickness direction D or the depth direction D1 of display unit 1, the position or the depth dimension of the engaging portion (top part of the arc) of grip handle 17 engaged with hook 33 is formed to be approximately equal to the depth dimension of first pivot 21 or stand-cum-joint 23, whereby grip handle 17 can be positioned closer to wall 31 so that it can be engaged with a hook 33 that is less projected from wall 31 and so that the display surface of liquid crystal display 3 is set approximately parallel to the wall 31 face when the display is wall mounted.

Fixing portion 19 is fixed through backside cover 7 of display unit 1 to the interior chassis by screws.

First pivot 21 is positioned at a height lower than the midpoint of display unit 1 with respect to the insert/remote direction H in which display unit 1 is inserted to and removed from stand/pillar structure 30, so as to broaden the angle adjustable range upwards, meeting usage conditions. Also, first pivot 21 holds stand-cum-joint 23 with a strength which keeps the posture of display unit 1 at the set position after a rotation with respect to the direction X of the elevation angle. It should be added that the axial direction of the pivot is parallel to the width direction of display unit 1.

Stand-cum-joint 23 is a structure having a circular cross-section (either solid column or cylinder), including: a rotational part 23a that is rotatably held on first pivot 21, disposed at the proximal end; and a non-skid/cushioning member 23b for skid prevention and cushioning function, formed of rubber, silicone or the like, at the distal end or at the end opposite to the rotational part 23a.

As shown in FIG. 2, the longitudinal distance (the distance with respect to the direction from the proximal end to the distal end) of the stand-cum-joint 23 is specified so that, with the length of stand-cum-joint 23 set parallel to liquid crystal display 3, its distal end is located to extend equal to or beyond the bottom side 1b of front frame 1a of display unit 1. In the present embodiment, the distance to bottom side 1b of front frame 1a of display unit 1 is 113 mm and the projected amount from bottom side 1b is about 19 mm. Accordingly, as shown in FIG. 1 which is the front view of the state of FIG. 2(b), stand-cum-joint 23 has a length extended downwards below the base side 1b of front frame 1a.

The reasons for the above configuration are described below:

(1) In a case of a liquid crystal display as a typical example of a thin type display device, referring to the tilt angle, in particular, liquid crystal displays have the viewing angle problem, and the tilt angle needs to be able to deal with all usage situations such as when a viewer may watch the liquid crystal display while sprawled, and other cases. To deal with such situations, when stand-cum-joint 23 is used in the second usage mode, i.e., as the supporting stand for display unit 1, it is significantly important that the length of the supporting stand is specified to project below the bottom side of the display portion when the supporting stand is set approximately parallel to the display unit. This setting of the length of projection permits great flexibility of the variable angle range.

From a viewpoint of installation space, it is necessary to secure a large tilt angle in an arrow space. Forth is purpose, it is desired that the joined position of stand-cum-joint 23 to display unit 1 is formed at a position as low as possible. This is because the distance between the ground-contact portion (bottom side) of display unit 1 and the ground-contact point (distal end) of stand-cum-joint 23 can be shortened so that it is possible to save space when stand-cum-joint 23 is used as a solo stand for supporting display unit 1.

When first pivot 21 is arranged at a lower position of the display unit, and when the supporting stand as it is set parallel to the display unit, projects slightly below the bottom side of the display portion, it is possible to obtain a large tilt angle in a narrow space.

(2) In a case of a thin type display device, wall-mounting is one of the features, and for wall-mounting, the display device has the advantage that the longer the supporting stand, the more stably the display is able to be attached.

Though the above-described grip handle 17, stand-cum-joint 23 and first pivot 21 are integrally formed as joint body 15 and attached to display unit 1, they can be of course fixed separately. However, assembly as one-piece structure is easy and has the advantage of manufacturing cost saving.

[Stand/pillar Structure 30]

Referring next to FIGS. 1 to 5, stand/pillar structure 30 composed of pillar 25 and stand base 29 will be described.

Pillar 25 is a column-like member having a length that permits formation of an insert space 27 enabling the bar-like portion having a circular cross-section, i.e., the part of stand-cum-joint 23 other than rotational part 23a, to be inserted and removed, and is fixed upright on stand base 29.

Insert space 27 is a hole having a circular cross section, and supports stand-cum-joint 23 in a manner that it receives stand-cum-joint 23 therein while non-skid/cushioning member 23b of stand-cum-joint 23 abuts the bottom of insert space 27. The diameter of insert space 27 is specified in such a size as to permit stand-cum-joint 23 to be freely inserted and removed and leave a clearance that allows stand-cum-joint 23 to rotate about the axis of the longitudinal direction of stand-cum-joint 23.

Stand base 29 has dimensions that can support display unit 1 at a predetermined height, by means of pillar 25 and joint body 15.

Next, the operational effect of the above-described stand type thin design television will be illustrated.

Figure 4:
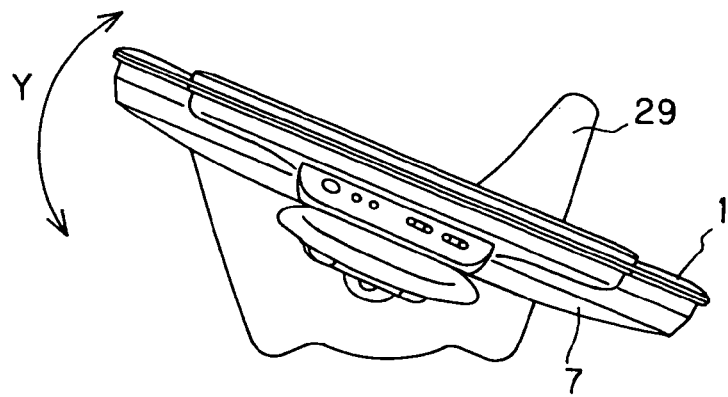
FIG. 4 is a top operational illustrative view of the stand type thin design television according to the first embodiment of the present invention.
Figure 26:
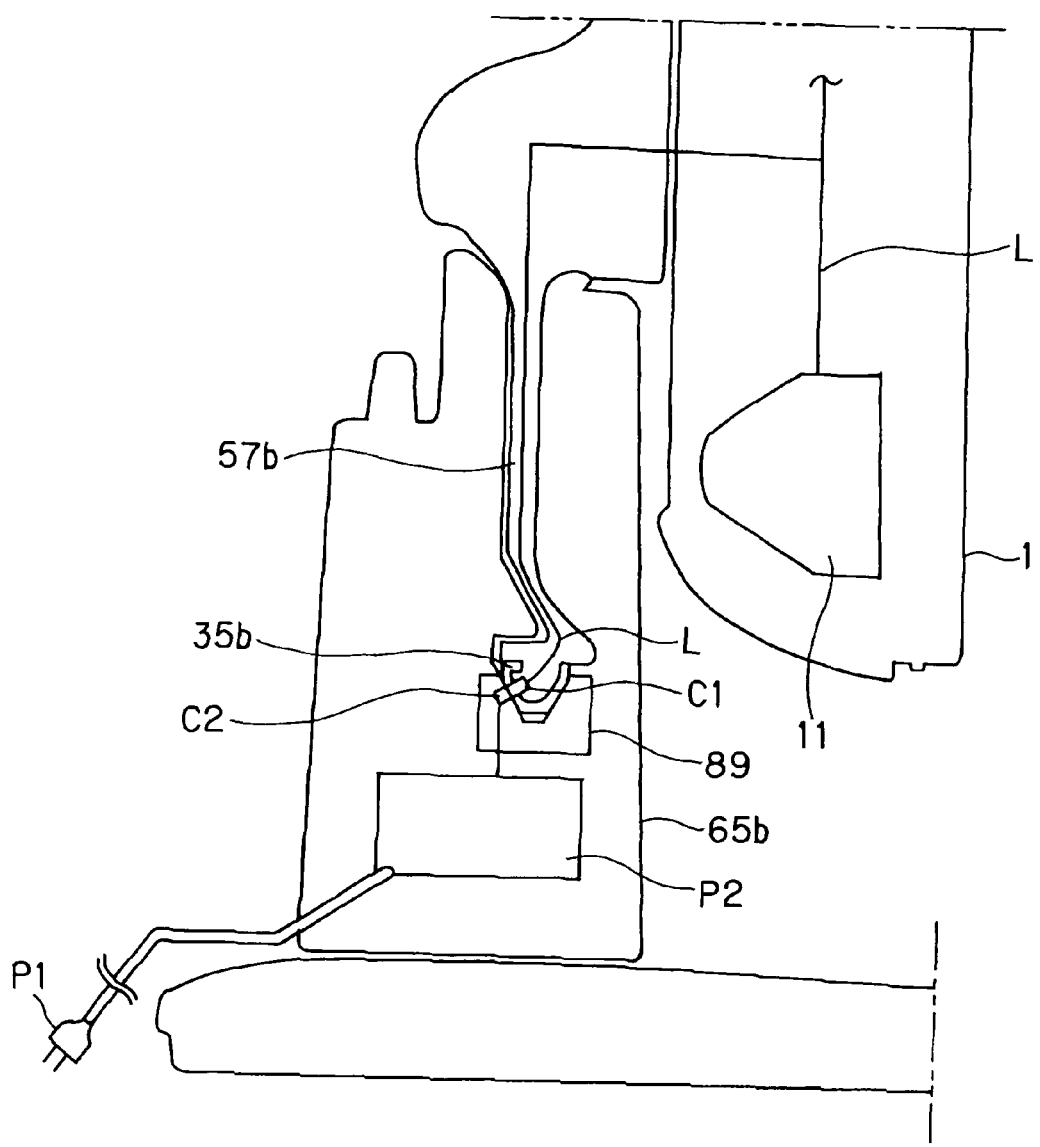
FIG. 26 is a schematic view for explaining a stand type thin design television according to the fourth embodiment of the present invention.
Figure 27:
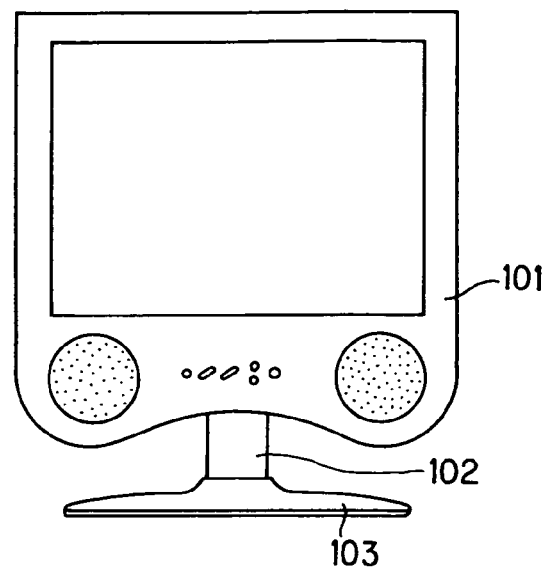
FIG. 27 is a front view showing a conventional stand type thin design television.
Figure 28:
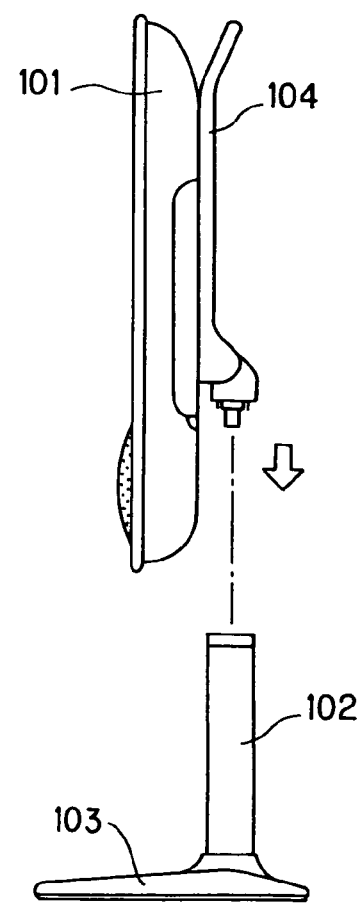
FIG. 28 is an illustrative view showing the assembly of a conventional stand type thin design television.
Figure 29:
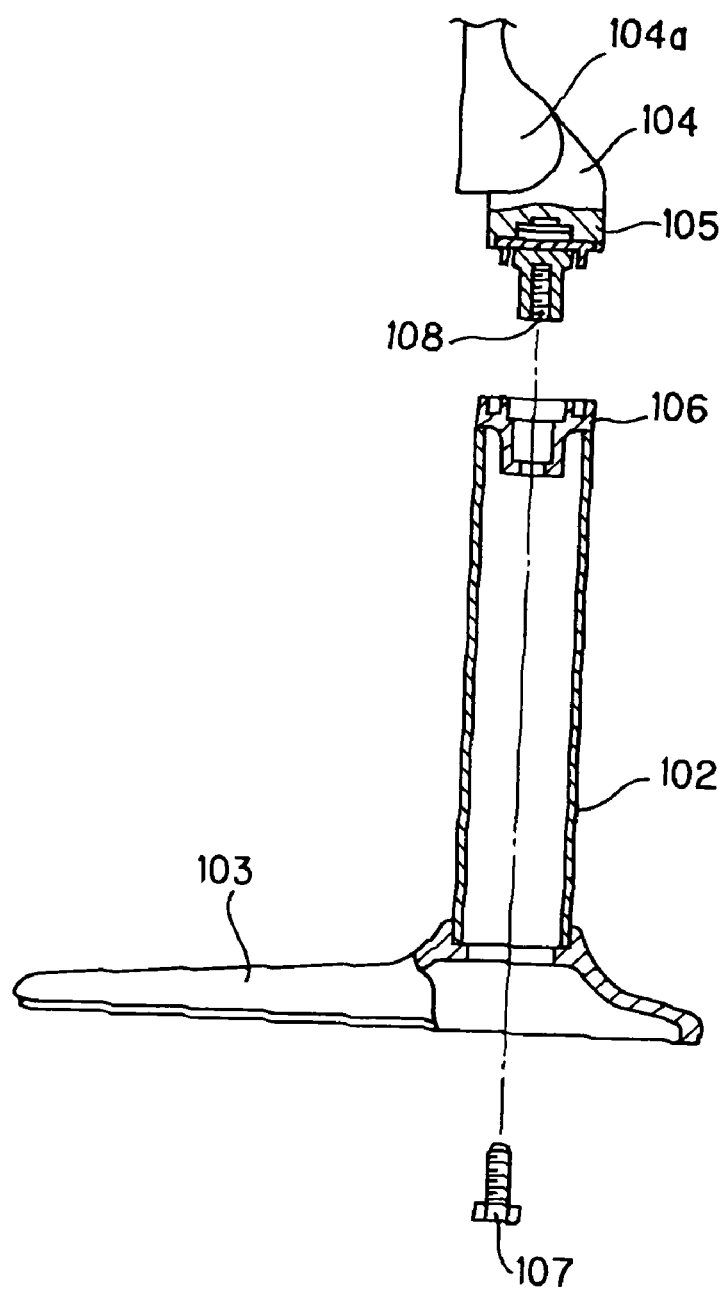
FIG. 29 is an illustrative view showing the assembly of a conventional stand type thin design television.
Figure 30:
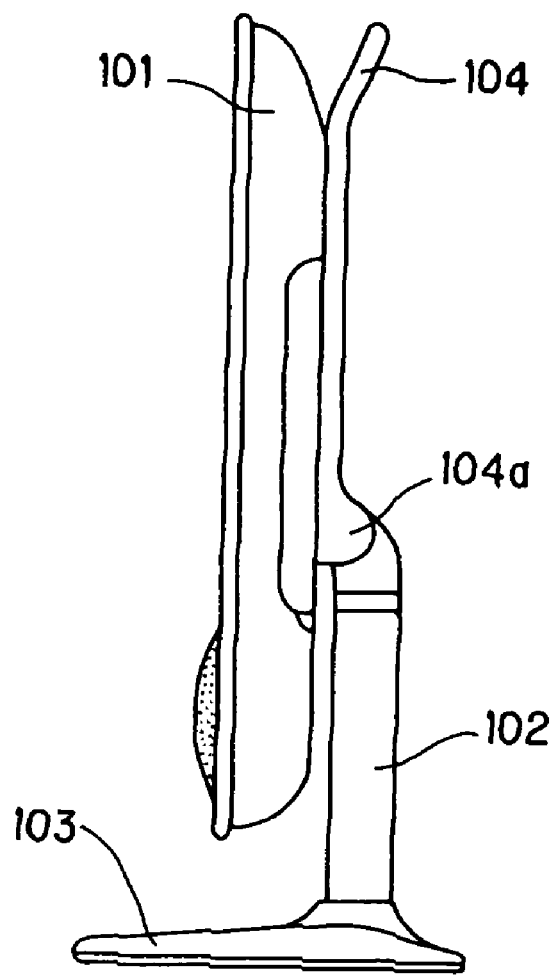
FIG. 30 is a side view of a conventional stand type thin design television.

To begin with, in the first usage mode in which stand/pillar structure 30 is used, display unit 1 is supported by inserting stand-cum-joint 23 of joint body 15 that is fixed to the backside of display unit 1 into insert space 27 of pillar 25, as shown in (a) to (b) in FIG. 2. Adjustment of the elevation angle X of display unit 1 in this first usage mode can be made as shown in FIG. 3 by rotating first pivot 21 relative to rotational part 23a of stand-cum-joint 23. Adjustment of the direction of display unit 1 in the horizontal direction Y in this first usage mode, can be made as shown in FIG. 4, by rotating display unit 1 in horizontal direction Y, relative to pillar 25, about the center axis of stand-cum-joint 23, or by rotating stand-cum-joint 23 in insert space 27, about the longitudinal axis thereof. When the display is used with stand-cum-joint 23 inserted in insert space 27 of stand/pillar structure 30, the longer the stand-cum-joint 23, the more stably the display unit 1 is supported. However, the length of stand-cum-joint 23 is enough as long as stand/pillar structure 30 is able to support display unit 1 by insertion of stand-cum-joint 23 into insert space 27 of stand/pillar structure 30. Conversely, the length of stand-cum-joint 23 is insufficient if display unit 1 cannot be supported by insertion of stand-cum-joint 23 into insert space 27 of stand/pillar structure 30 and falls down without screws, etc., as in the conventional example (FIG. 26). The specific length should be determined based on the size and weight of display unit 1, the size of base stand 29, the height of stand/pillar structure 30 and other factors.

Figure 5:
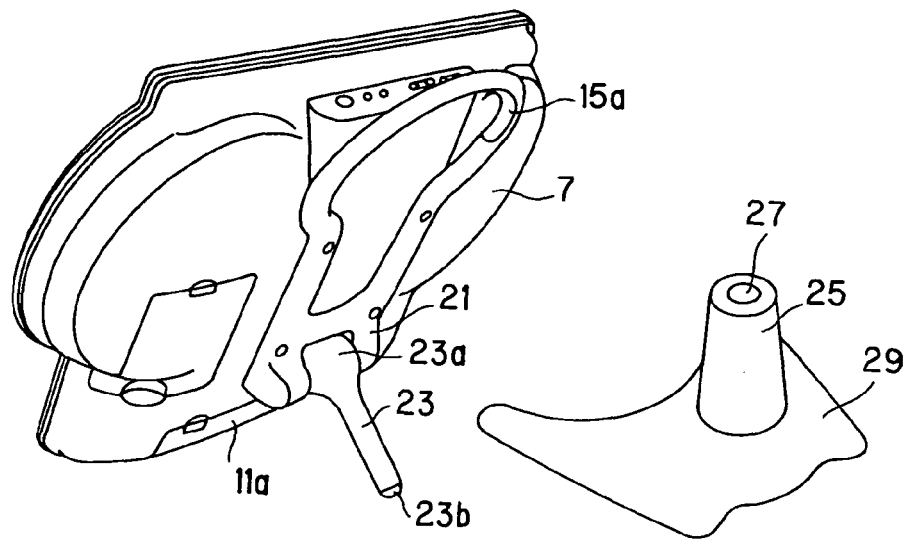
FIG. 5 is a perspective view showing the second usage mode of the stand type thin design television according to the first embodiment of the present invention.

Next, in the second usage mode in which, instead of using stand/pillar structure 30, stand-cum-joint 23 is used as the stand for supporting display unit 1, stand-cum-joint 23 is pulled out from insert space 27 of pillar 25 by holding grip handle 17, for example, as shown in (b) to (a) in FIG. 2, and display unit 1 is supported by base rails 13 arranged on the bottom surface of display unit 1 and non-skid/cushioning member 23b disposed at the distal end of stand-cum-joint 23, as shown in FIG. 5.

Since stand-cum-joint 23 is provided to be longer than the bottom side 1b of display unit 1, the angle of elevation X of liquid crystal display 3 (the vertical angle of the orientation of liquid crystal display 3) can be adjusted stably by taking a large distance between base rails 13 and non-skid/cushioning member 23b when the angle of stand-cum-joint 23 is adjusted relative to liquid crystal display 3.

As described above, since display unit 1 is supported by base rails 13 provided on the undersurface of display unit 1 and stand-cum-joint 23, the display unit 1 can be installed in a narrow space that affords placement of display unit 1 and stand-cum-joint 23.

Also, since the angle of elevation X is adjusted by stand-cum-joint 23, it is possible to adjust the angle of elevation X of display unit 1 with a simple structure and in a limited space.

Further, without the necessity of pillar 25, the display unit can be easily mounted at the height of a table top, etc., and still the angle of elevation X can be adjusted.

In addition, when, instead of using stand-cum-joint 23 as a stand, grip handle 17 is used as a mounting attachment to wall 31 as shown in FIG. 6, display unit 1 can be used as a wall-mounted TV. In this case, since grip handle 17 is formed in the arc shape, hook 33 engages the topmost position of the arc, so that display unit 1 can be mounted in a stable position without skew.

Figure 7:
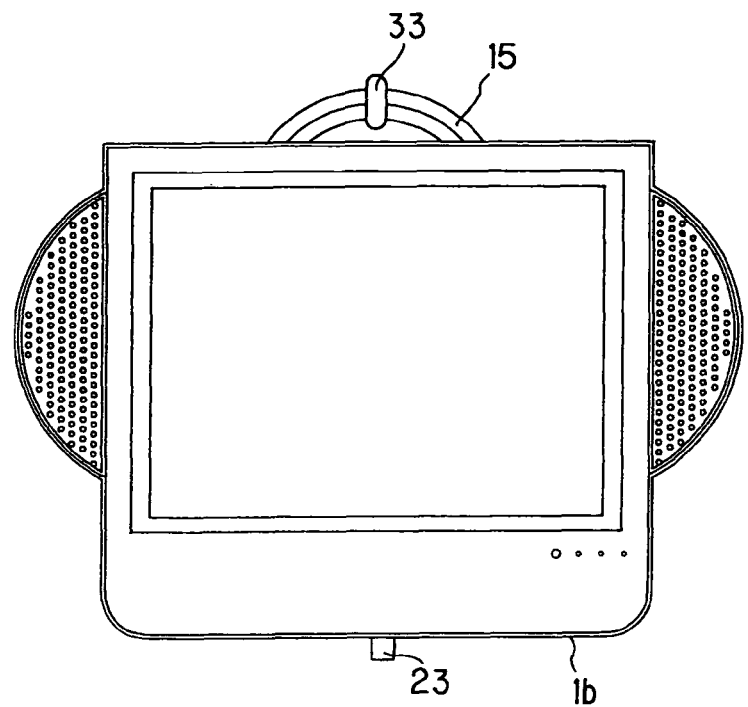
FIG. 7 is a front view of the stand type thin design television when display unit 1 is wall mounted, according to the first embodiment of the present invention.
Figure 8:
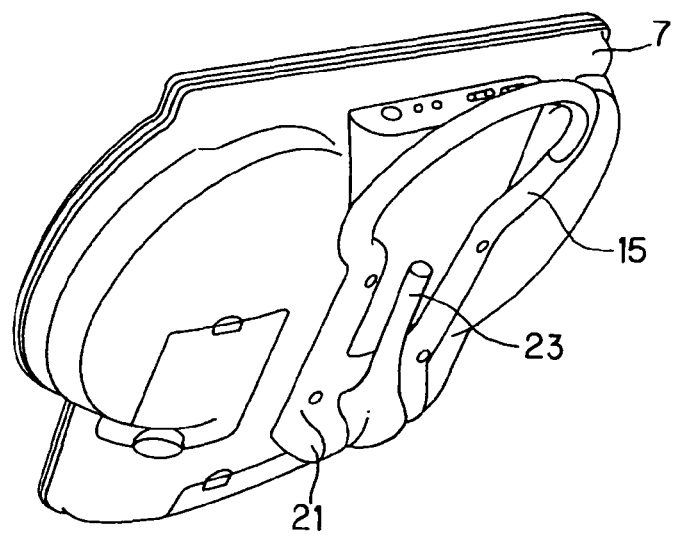
FIG. 8 is an operational illustrative view showing a stand-cum-joint 23 of the stand type thin design television according to the first embodiment of the present invention.

When the display in the state shown in FIG. 2(a) is engaged on hook 33 so as to be used as the wall-mounted TV as shown in FIG. 7, stand-cum-joint 23 may be seen projecting below bottom side 1b of display unit 1. In this case, stand-cum-joint 23 is turned about 180 degrees about pivot 21 to the upper side of display unit 1 as shown in FIG. 8 so that stand-cum-joint 23 will not be projected (exposed) below bottom side 1b, hence preventing the appearance from being marred. Also, when display unit 1 is wall-mounted, it is possible to adjust the angle of elevation of display unit 1 in its wall-mounted state by controlling the amount of rotation of stand-cum-joint 23 about pivot 21.

Here, when the depth dimension of display unit 1 at first pivot 21 is formed to be greater than the depth dimension of display unit 1 at the distal end of grip handle 17, display unit 1 will be set with a certain angle of depression when used as a wall-mounted TV, hence the display is easy to view from below when it is mounted at an upper position on the wall and suitable as a wall-mounted TV. In this case, stand-cum-joint 23 functions as an angle adjuster for adjusting the angle of elevation or depression of display unit 1.

It is also preferred as a wall-mounted TV if the topmost part of grip handle 17 is projected above the top edge of front frame 1a as shown in FIG. 7.

Further, stand-cum-joint 23 functions as a stand-cum-angle adjuster when the display unit is used as a wall-mounted TV and in the second usage mode.

Additionally, since first pivot 21 is positioned at a height lower than the midpoint of display unit 1 with respect to the direction H in which display unit 1 is inserted to and removed from stand/pillar structure 30, stand-cum-joint 23 will not jut out above display unit 1 if stand-cum-joint 23 is turned approximately 180 degrees about pivot 21.

In the above description of the stand type thin design television according to the first embodiment, rotation of display unit 1 in horizontal direction Y is achieved by the means of rotating joint body 15 relative to pillar 25, however the present invention should not be limited to this. Next, a second embodiment in which display unit 1, joint body 15 and pillar 25 rotate in horizontal direction Y relative to stand base 29 will be described.

The Second Embodiment

Figure 15:
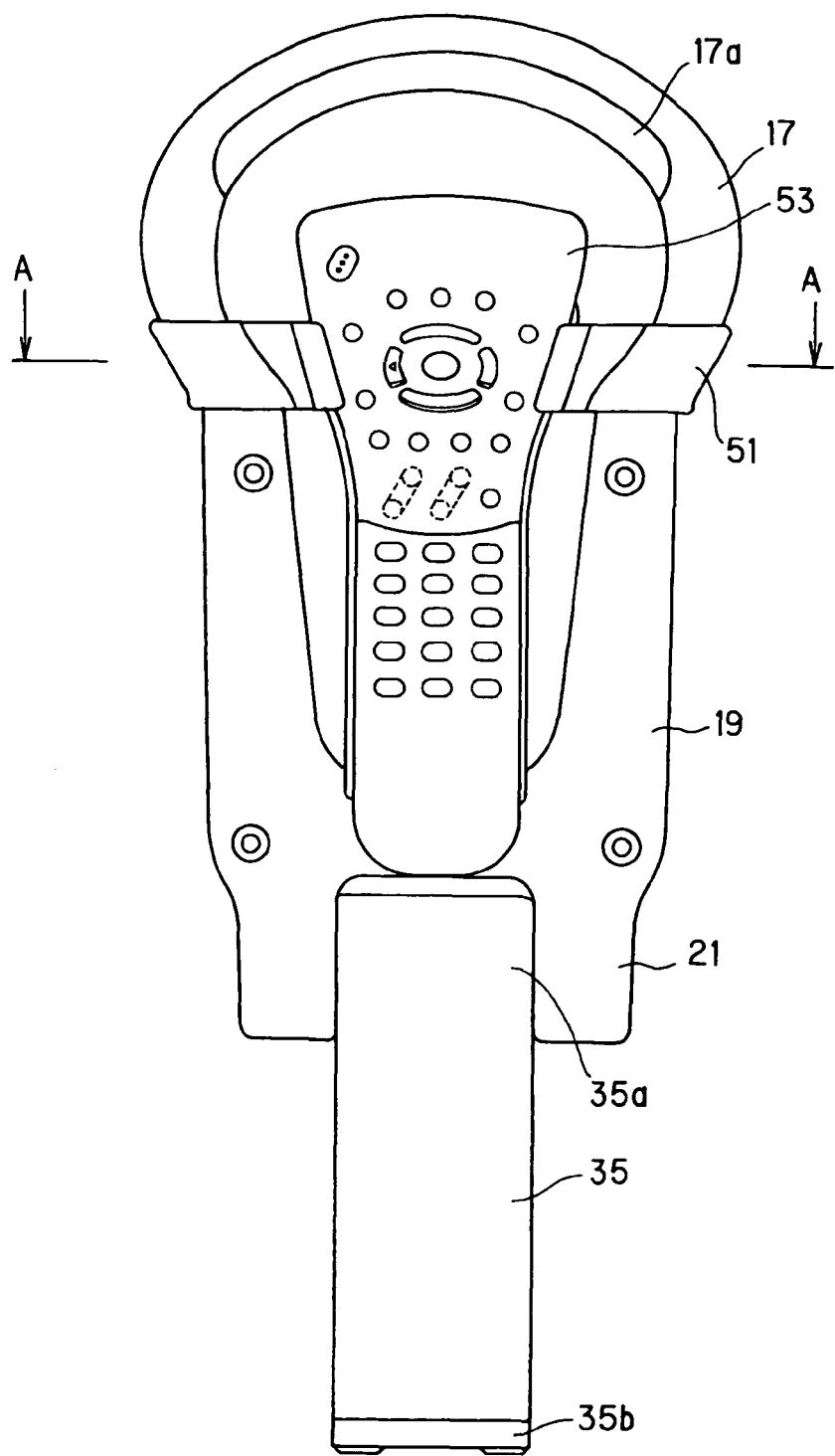
FIG. 15 is a front view showing a remote controller holder 51 for holding a remote controller 53 according to the second embodiment of the present invention.
Figure 16:
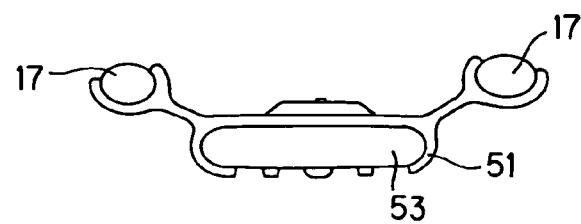
FIG. 16 is a sectional view cut on a plane A-A in FIG. 15.
Figure 17:
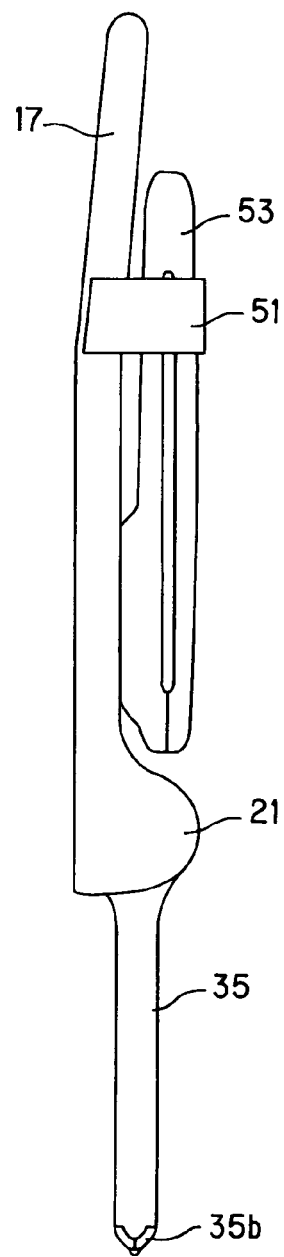
FIG. 17 is a schematic side view of FIG. 15.

The second embodiment of the present invention will be described hereinbelow in detail with reference to the drawings. Here, the same components as in the above configuration are allotted with the same reference numerals so that their description is omitted while the differences from the above configuration will be mainly illustrated. Roughly speaking, the differences from the above embodiment reside in that the cross section of the stand-cum-joint is modified from a circle to an approximate rectangle (FIGS. 9 and 14) while the shape of pillar is modified in accordance with the change of the shape of the stand-cum-joint (FIGS. 9 and 14), that the pillar is adapted to be rotatable in the horizontal direction Y relative to the stand base (FIG. 9) and that a remote controller holder 51 for holding a remote controller 53 of display unit 1 is provided for grip handle 17 (FIGS. 15 to 17). The details will be described hereinbelow.

A stand-cum-joint 35 according to this embodiment includes: a rotational part 35a that is rotatably held on first pivot 21, disposed at the proximal end; and a non-skid/cushioning member 35b for skid prevention and cushioning function, formed of rubber, silicone or the like, at the distal end or at the end opposite to the rotational part 35a, and has a cross section that is long in the direction of the rotational axis (direction of the support shaft) of the first pivot 21, specifically, an approximately rectangular cross section, for example.

Forming stand-cum-joint 35 so as to have a rectangular cross section that is long in the direction of the rotational axis of first pivot 21 is able to reduce the dimension of the depth direction D1 (FIG. 10) of display unit 1 of joint body 15 while increasing the stability of supporting display unit 1 in the second usage mode (where the display is separated from stand/pillar structure 30). Specifically, in the case of stand-cum-joint 23 of the first embodiment, the contact points with the mounted site in the second usage mode will form an approximately triangular shape, enclosed by base rails 13 and non-skid/cushioning member 23b. On the other hand, in the case of stand-cum-joint 35 of the second embodiment, since the non-skid/cushioning member 35b has a greater dimension in the direction of the rotational axis (the longitudinal direction of the bottom of display unit 1) of first pivot 21 than that of the non-skid/cushioning member 23b, the area enclosed by base rails 13 and non-skid/cushioning member 35b forms a tetragon or trapezoidal shape having a long side defined between base rails 13 and a short side defined by the width of non-skid/cushioning member 35b. As a result, if both the stand-cum-joints are set at the same inclination with respect to respective display units 1, the stand-cum-joint 35 can create a greater supporting area for display unit 1, hence providing improved stability.

Figure 9:
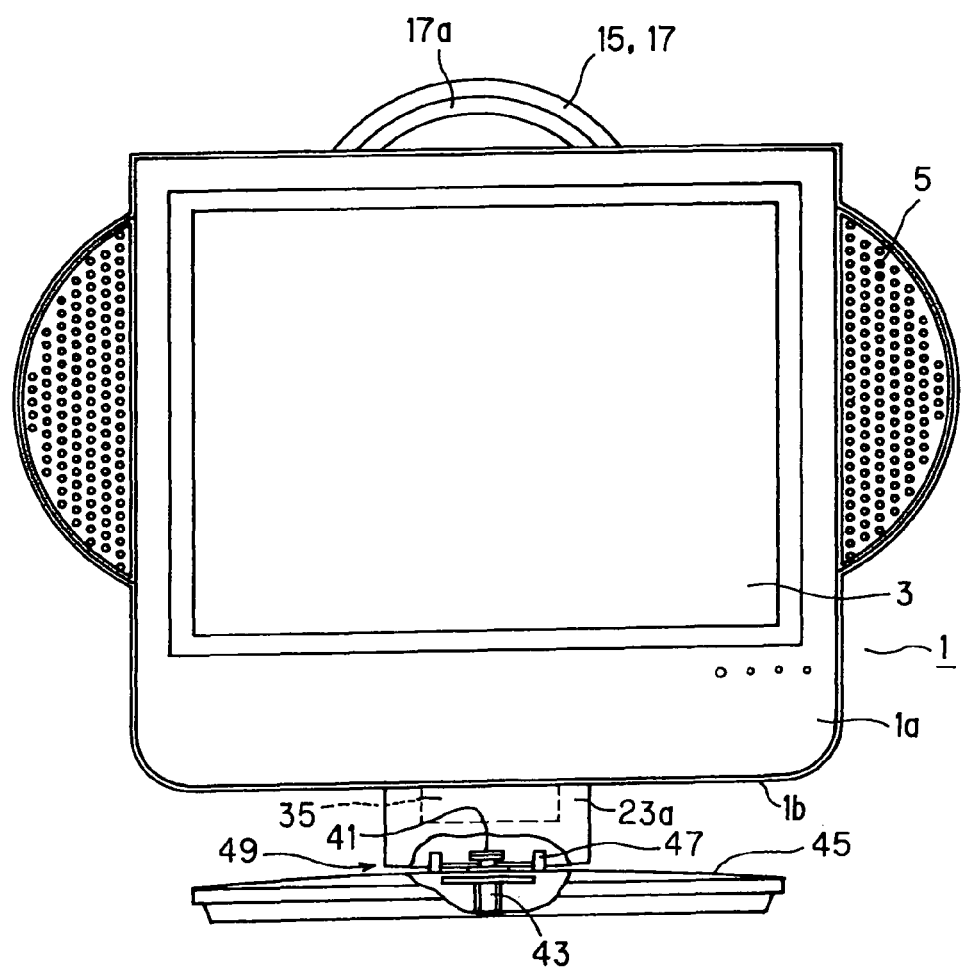
FIG. 9 is a front view showing the first usage mode of a stand type thin design television, in a partially cutaway representation, according to the second embodiment of the present invention.
Figure 10:
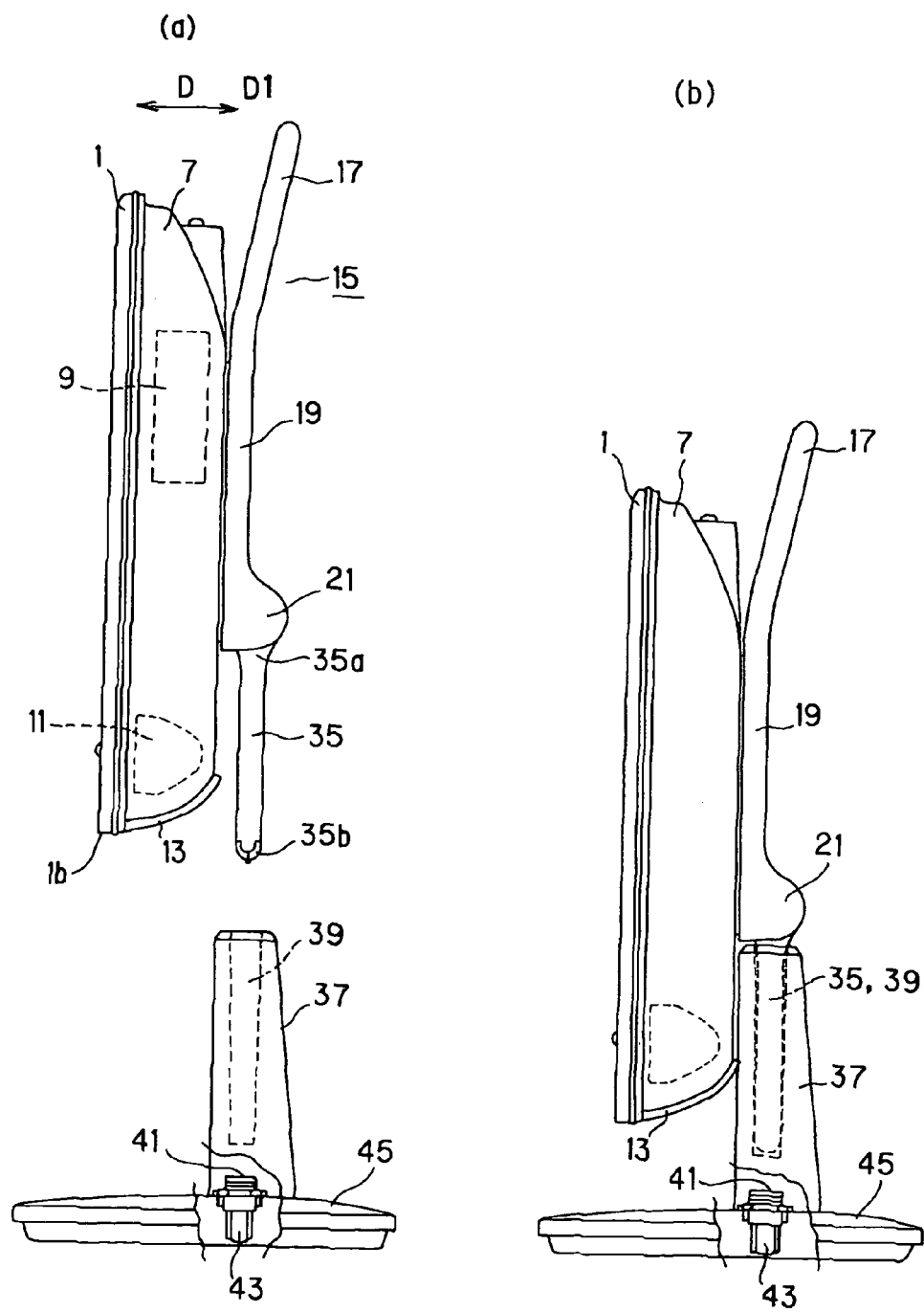
FIG. 10 is a side view of the stand type thin design television according to the second embodiment of the present invention, (a) showing a state where a display unit 1 is separated from a pillar 37, (b) showing a state where display unit 1 and pillar 37 are joined.
Figure 11:
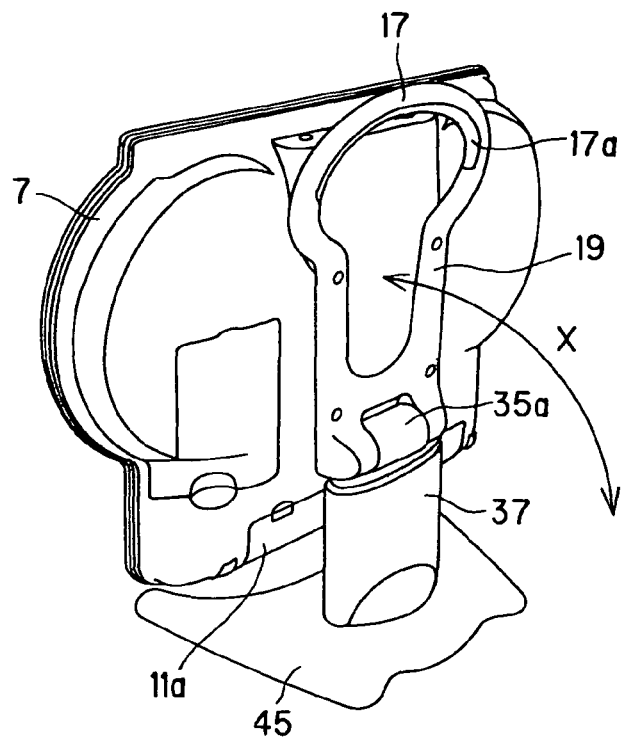
FIG. 11 is a perspective operational illustrative view showing the backside of the stand type thin design television according to the second embodiment of the present invention.
Figure 12:
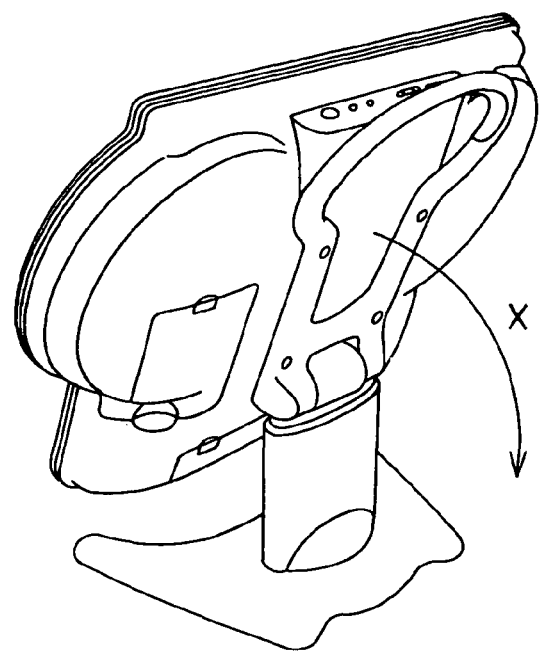
FIG. 12 is an operational illustrative view showing a state where the display unit 1 of FIG. 11 is tilted with respect to the direction X of the angle of elevation.
Figure 13:
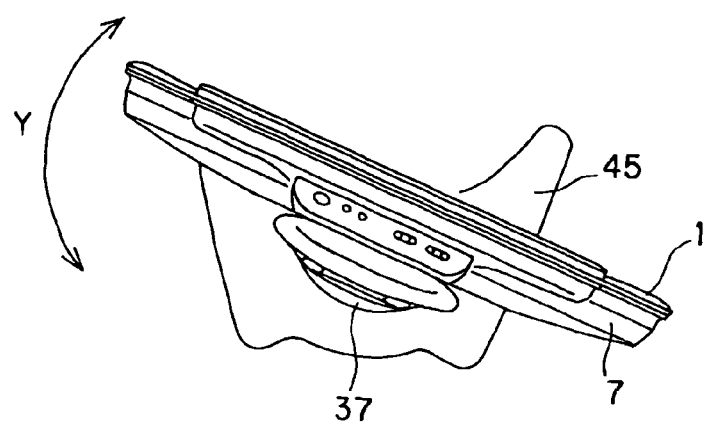
FIG. 13 is a top operational illustrative view of the stand type thin design television according to the second embodiment of the present invention.

As shown in FIGS. 9 and 10, the longitudinal distance (the distance from the proximal end to the distal end) of the stand-cum-joint 35 is specified so that, with the length of stand-cum-joint 35 set parallel to liquid crystal display 3, its distal end is formed to extend equal to or beyond the bottom side 1b of front frame 1a of display unit 1. In the present embodiment, the distance to bottom side 1b of front frame 1a of display unit 1 is 113 mm and the projected amount from bottom side 1b is about 19 mm. Accordingly, as shown in FIG. 9 which is the front view of the state of FIG. 10(b), stand-cum-joint 35 has a length extended downwards below the base side 1b of front frame 1a.

Figure 14:
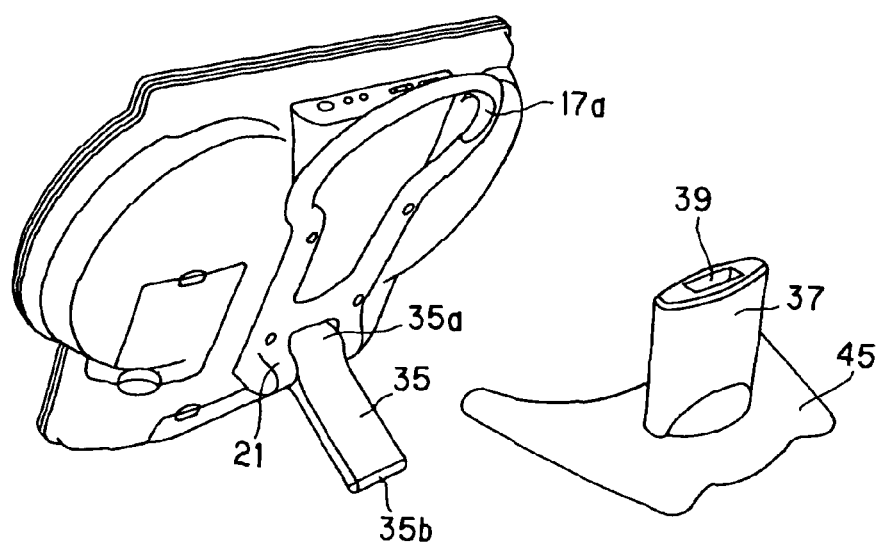
FIG. 14 is a perspective view showing the second usage mode of the stand type thin design television according to the second embodiment of the present invention.

A pillar 37 of the present embodiment has an elliptic shape in cross section, as shown in FIG. 14 and is formed with an insert space 39 similar to the cross section of stand-cum-joint 35 having an approximately rectangular shape.

Insert space 39 is a hollow having an approximately rectangular cross section, and supports stand-cum-joint 35 in a manner that it receives stand-cum-joint 35 therein while non-skid/cushioning member 35b of stand-cum-joint 35 abuts the bottom of insert space 39. The cross section of insert space 39 is sized so that the stand-cum-joint 35 will be freely inserted to and removed from the insert space without suffering any uncomfortable backlash when it is inserted therein. Accordingly, rotational force acting on display unit 1 in a horizontal direction is transferred to pillar 37 by way of joint body 15 and stand-cum-joint 35.

In order to enable relative rotation in horizontal direction Y, pillar 37 and a stand base 45 are formed with fitting part 41 and fitting socket part 43, similar to fitting part 105 and fitting socket part 106 shown in the prior art, and fitting part 41 and fitting socket part 43 are formed so that they engage each other and are able to rotate relative to each other.

Also, a smoother 47 is provided at the bottom of pillar 37 on the side of stand base 45 in order to suppress generation of uncomfortable friction sounds and contact damage during its rotation relative to stand base 45. The material of smoother 47 can be selected as appropriate, taking into account the material of stand base 45; for example, plastics, hard rubber, silicone, and other materials can be used.

In the joint portion between pillar 37 and stand base 45, in order to realize smooth rotation of pillar 37 and in order to suppress generation of uncomfortable fiction sounds and contact damage during the rotation relative to stand base 45, a clearance 49 is formed so as to become greater as it goes away from the rotational center, i.e., fitting part 41 and fitting socket part 43, as shown in FIG. 9. Here, stand base 45 has dimensions that can support display unit 1 at a predetermined height by means of pillar 37 and joint body 15.

In the present embodiment, a remote controller holder 51 for holding remote controller 53 of display unit 1 is provided for grip handle 17, as shown in FIGS. 15 to 19. Since display unit 1 of this embodiment can be used separated from pillar 37, there is a risk of remote controller 53 being away from display unit 1, which produces inconvenience. Provision of remote controller holder 51 in grip handle 17 that separates from pillar 37 together with display unit 1, makes it possible to move the display unit with remote controller 53 to another location, it is possible to prevent remote controller 53 from being carelessly mislaid or lost.

Figure 18:
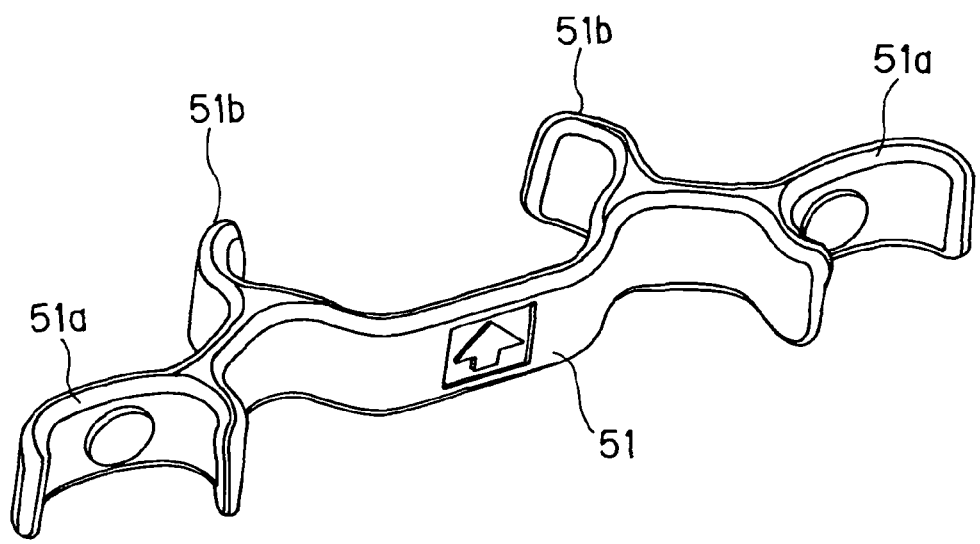
FIG. 18 is a perspective view showing a remote controller holder 51 according to the second embodiment of the present invention.

The remote controller holder 51 in this embodiment is composed of, as shown in FIG. 18, attachment segments 51a to be attached to the display unit 1 side and a pair of claws 51b for engaging remote controller 53 to hold it.

Figure 19:
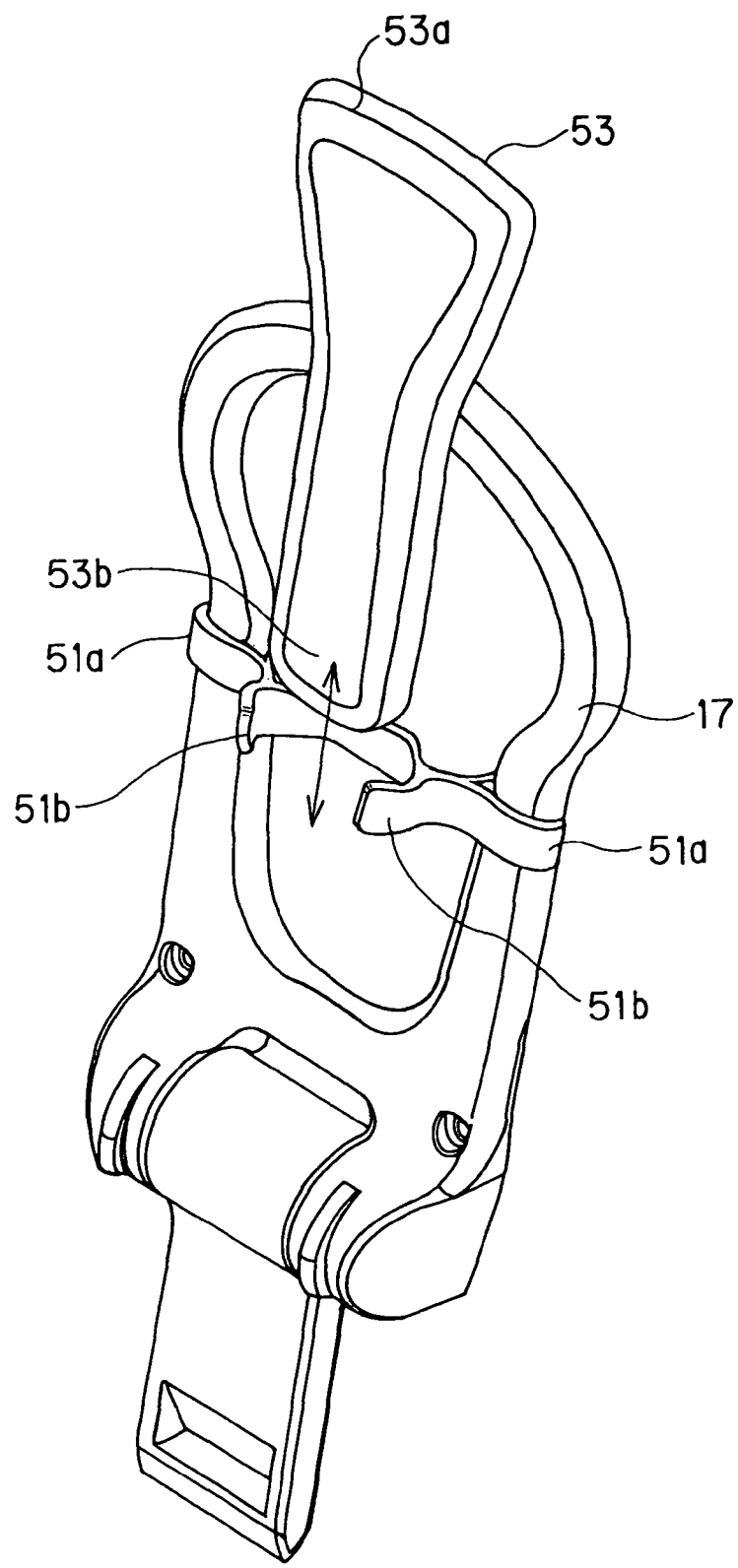
FIG. 19 is a perspective view showing how a remote controller 53 is attached to and detached from remote controller holder 51 of the second embodiment of the present invention.

Specifically, when remote controller 53 has a configuration that significantly tapers from one end 53a to the other end 53b as shown in FIG. 19, remote controller 53 may be inserted with its tapered end 53b first into the hold of paired claws 51b as shown in FIG. 19 so that the front end 53a side, which is formed greater in width, are caught by the claws and engaged thereby as shown in FIG. 15. In this case, if claws 51b and 51b of remote controller holder 51 are formed so as to be inclined appropriately so that their distance becomes smaller from the upper to lower sides of display unit 1, the tapering remote controller 53 can snugly fit therein, which is preferable.

When remote controller holder 51 is formed of a material such as a plastic, etc., which has appropriate flexibility and is formed so that two claws 51b and 51b can hold remote controller 53 with pressure, inserting remote controller 53 into remote controller holder 51 with a certain force causes claws 51b to elastically deform to thereby hold remote controller 53 in remote controller holder 51 in a gripping manner.

When claws 51b of remote controller holder 51 are designed so as to constrict remote controller 53 with some strength when held in place, it is no longer necessary to shape remote controller 53 with the one end (53a side) enlarged and the other end (53B side) reduced in size, hence the holder is able to hold remote controllers 53 of various shapes.

It should be noted that the shape and position of attachment of remote controller holder 5 and other configurations are not limited, and the remote controller holder may be attached directly to the backside of display unit 1. That is, it may have any shape, configuration and may be positioned at any place as long as remote controller 53 can be carried together with display unit 1. Also, it may assume any shape as long as it can fit with the remote controller. Further, it is possible to provide a configuration such that remote controller 53 is fitted into display unit 1 itself so as be carried together.

Up to now, the configuration and operational effects have been described by referring mainly to the differences of the configuration in the second embodiment, it goes without saying that the operational effects described in the first embodiment can be also obtained.

It should be also noted that the above-described stand-cum-joint 35 has an elongated, approximately rectangular cross section, long in the axial direction of first pivot 21, and it is not limited to the approximately rectangular shape, but stand-cum-joint 35 may have any shape as long as the rotation of stand-cum-joint 35 can be transferred to pillar 37.

It also goes without saying that the remote controller holder 51 described in the second embodiment can be applied to the configuration of the first embodiment.

The first and second embodiments are constructed so that stand-cum-joints 23 and 35 are pulled out from insert spaces 27, 39, respectively. An unillustrated coupling pin for removal prevention of stand-cum-joint 23 or 35 from corresponding insert space 27 or 39 may be provided so as to be inserted into stand-cum-joint 23 or 35 by penetrating through pillar 25 or 37. This configuration makes it possible to move display unit 1 as a whole up to stand base 29 or 49, by lifting grip handle 17. However the anti removal means is not limited to insertion of a coupling pin. This will be further detailed next as the third embodiment.

The Third Embodiment

Figure 24:
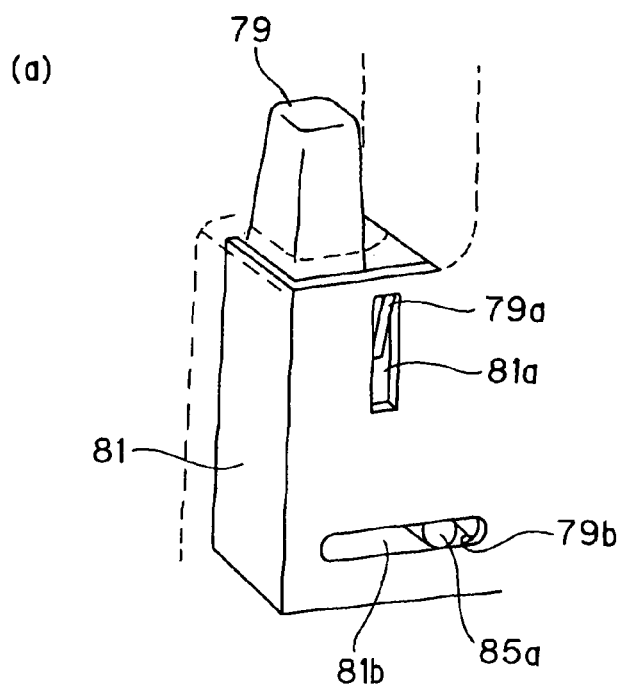
FIG. 24 is a perspective backside view of FIG. 23.
Figure 24:
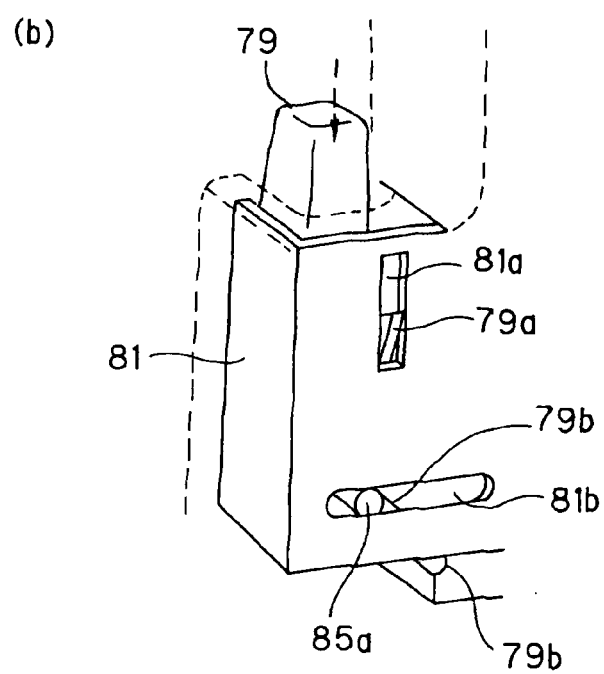
Figure 25:
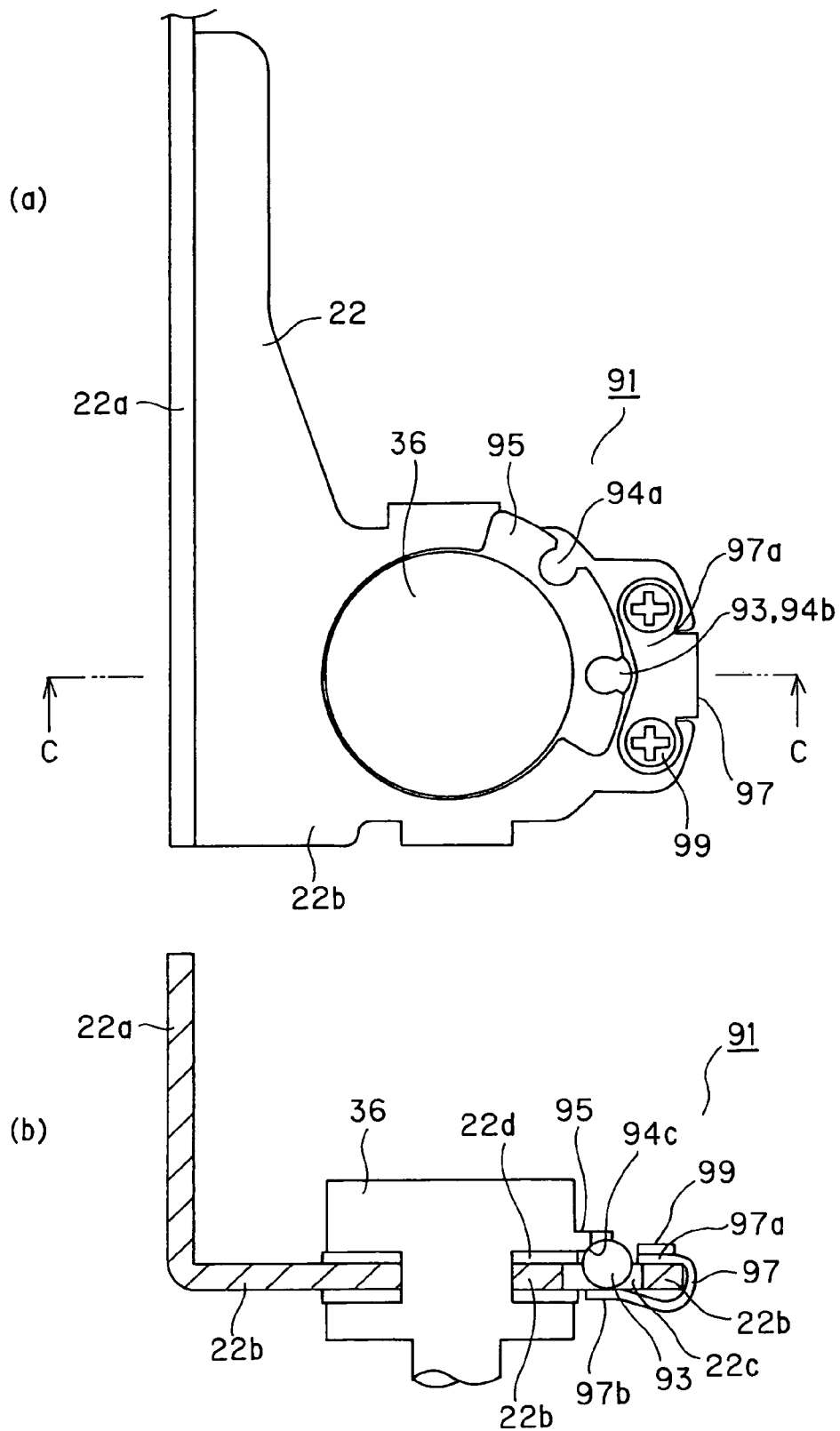
FIG. 25 is a view of a sound generator 93 of a display unit 1, (a) a side view and (b) a sectional view cut along a plane C-C.

Next, the third embodiment of the present invention will be described in detail with reference to the drawings. Here, the same components as in the above configuration are allotted with the same reference numerals so that their description is omitted while the differences from the above second embodiment will be mainly illustrated. Roughly speaking, the differences from the above second embodiment reside in that a hollow 59 for removal prevention and a projection 61 for insert direction restraint are provided for the stand-cum-joint, that the length of the stand-cum-joint is changed to equal to or shorter than that to the bottom side 1b of front frame 1a of display unit 1 when it is set parallel to liquid crystal display 3 (FIGS. 20 and 21), that an anti removal device of the stand-cum-joint is provided for the pillar (FIGS. 20 to 24), that projections 55 are formed in first pivot 21 while the shape of the upper end of the pillar is modified in order to limit the angle of elevation of display unit 1 when and after the stand-cum-joint is joined to the pillar (FIGS. 20 and 21), and that an indicating device for recommending the angles of elevation of display unit 1 is provided between first pivot 21 and the stand-cum-joint (FIG. 25). Details are given herein below.

[Stand-cum-joint 57]

A stand-cum-joint 57 of this embodiment has an approximately rectangular cross section as of stand-cum-joint 35, but is formed with a length which does not exceed the bottom side 1b (base rail 13) of front frame 1a of display unit 1 (including the equal length) and can at least function as a stand for supporting display unit 1 in the second usage mode. Specifying the length of stand-cum-joint 57 as above puts the center of gravity of display unit 1, in the second usage mode, at a point on the stand-cum-joint 57 side (the backside cover side), whereby it is possible to reliably prevent damage of the delicate display screen because even if an external force toppling display unit 1 acts thereon, the display unit only falls down to the backside cover 7 side.

Stand-cum-joint 57 has a hollow 59 (FIG. 20) for preventing its separation from the joined state to a pillar 65 and a restraint projection 61 (FIG. 21) for limiting the direction of its insertion into pillar 65 to one way only.

[Anti-removal Device on the Stand-cum-joint Side]

Anti-removal hollow 59 (FIG. 20) is located on the opposite side of the face opposing display unit 1 when the smoother/cushioning member 35b of stand-cum-joint 57 is positioned at the bottom side 1b of display unit 1, and formed closer to the free end side (the smoother/cushioning member 35b side) with respect to the length of the stand-cum-joint (rotational part 35a-smoother/cushioning member 35b direction). This anti removal hollow 59 has an approximately a triangular prism-like shape, long in the width direction of stand-cum-joint 57, and the hollow is formed so that the depth of the hollow becomes greater towards the free end side (the smoother/cushioning member 35b side).

[Insert Limiting Device]

Restraint projection 61 (FIG. 21) is provided at the opposite side of anti removal hollow 59 of stand-cum-joint 57, and is a hill-shaped portion or a convex portion, projected in the direction perpendicular to the direction of insertion of stand-cum-joint 57 into pillar 65 (also to be abbreviated as "direction perpendicular to insertion" in some cases). Restraint projection 61 is one example of the insert limiting device for guiding the insertional direction of stand-cum-joint 57 into pillar 65 to only one way, and the present invention should not be limited to the position and configuration of restraint projection 61. When, for example, the insert limiting device is formed with a projection or groove (recess, hollow and cutout), a projection or groove such as the hill shape, convex shape and the like, projected or recessed in the direction perpendicular to insertion may and should be formed at the portion of pillar 65 where stand-cum-joint 57 is inserted. Alternatively, without forming any projection or groove, the sectional shape of stand-cum-joint 57, i.e., the shape to be inserted into pillar 65 may be formed with a sectional shape, such as a trapezoid, etc., which can limit its insertion to only one way.

Thus, provision of the insert limiting device as above makes it possible to prevent loss of balance in the first usage mode due to placement of display unit 1 in an unexpected position or prevent the apparatus from falling over. That is, in order to prevent pillar 65 from falling over due to the center of gravity shifting to the display unit 1 side, stand base 45 (FIG. 21) is formed so as to extend greatly to the display screen side compared to the rearward from pillar 65. Nevertheless, there is a risk of falling if stand-cum-joint 57 is accidentally inserted by turning front side back, so the provision of the insert limiting device undoubtedly eliminates the possibility of such falling.

[Rotation Restraint Structure]

Figure 20:
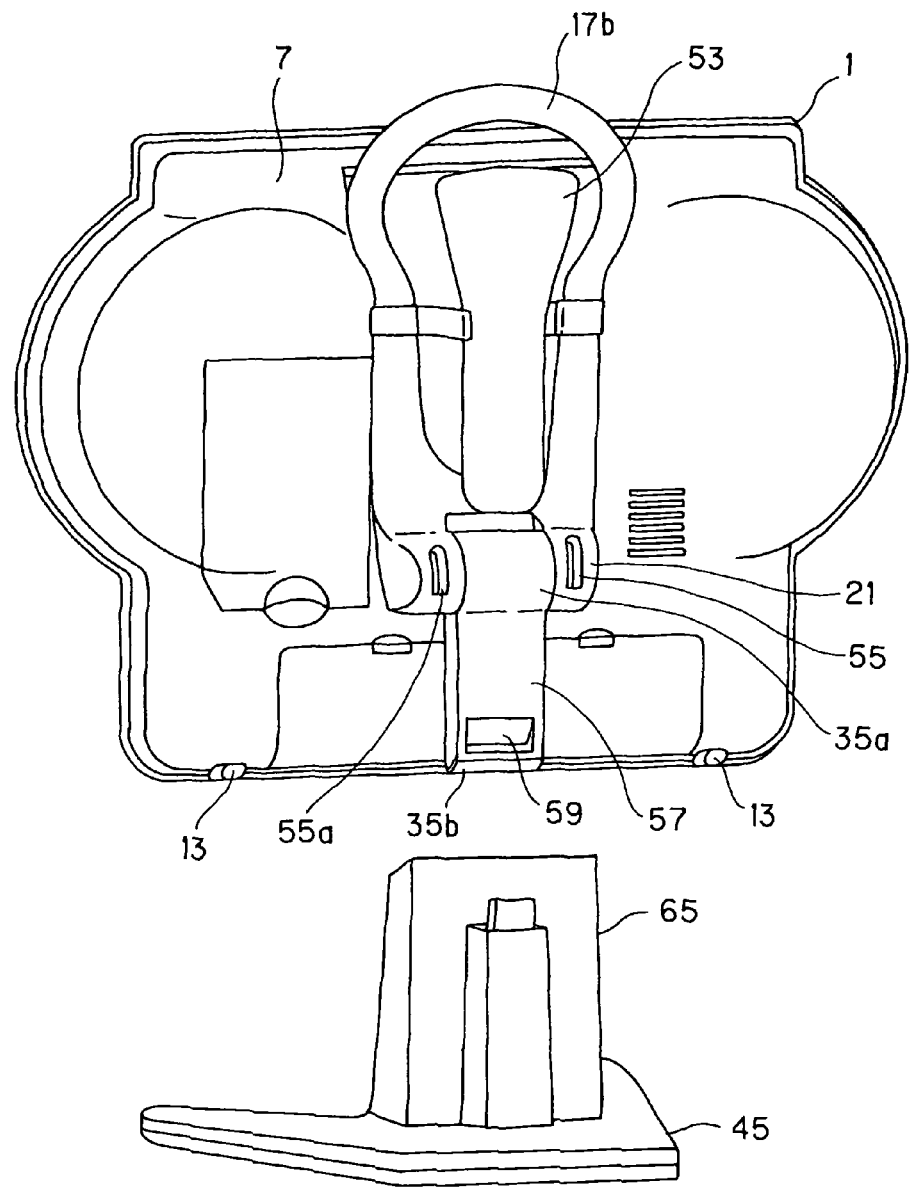
FIG. 20 is a backside perspective view of a stand type thin design television according to the third embodiment of the present invention.
Figure 21:
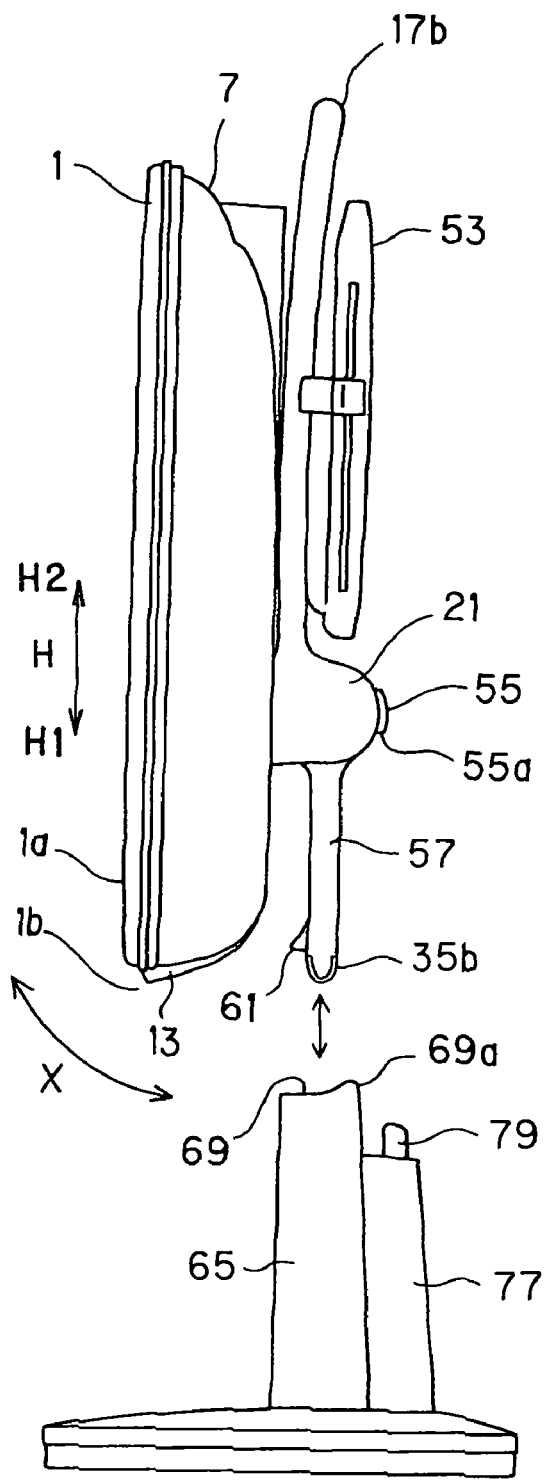
FIG. 21 is a side view showing the stand type thin design television according to the third embodiment of the present invention.

In order to limit the angle of elevation of display unit 1 when and after coupling between pillar 65 and stand-cum-joint 57, projections 55 are formed on first pivot 21 (FIGS. 20 and 21).

Projections 55 are formed on first pivot 21 along the direction of rotation of stand-cum-joint 57. In the present embodiment, the surface of first pivot 21 where no projection 55 is formed, is defined approximately semi-circularly, equidistant from the center of the rotational axis of stand-cum-joint 57 while the portion with projection 55 is defined by a longer distance away from the center of the rotational axis of stand-cum-joint 57 than that in the area without projection 55. Thereby, in the state where projections 55 interfere with pillar 65, the display takes an unstable position in which the anti removal device does not function correctly, so that the user will be reminded that the attachment has been done beyond the permissible position range.

Additionally, even in the first usage mode in which the anti removal device functions correctly, if an attempt to tilt the display with respect to the direction of elevation is made toward an imbalanced position, the underside faces 55*a* of projections 55 interfere and collide with an rear edge 69*a* (FIG. 21) of a upper face 69 of pillar 65, so that a further rotation in the direction of elevation is limited, to thereby prevent imbalance usage in the first usage mode beforehand.

Further, the disposition of projections 55 in the area, e.g., first pivot 21, which engages or is close to the upper face 69 of pillar 65 and rotates together with display unit 1, makes it possible to put positional restraint when set into the first usage mode and limit forcible rotation of display unit 1 with respect to the direction of elevation in the first usage mode, without limiting the angle of elevation of display unit 1 in the second usage mode. As a result, it is possible to set up the different permissible elevation ranges of the display unit 1 between in those in the first usage mode and those in the second usage mode, hence safe use conditions meeting the usage modes can be secured.

It should be understood that as the means for implementing the above restraint, other configurations, in which the distance from the rotational axis of stand-cum-joint 57 to the surface of first pivot 21 is changed (the distance is made longer for the restraint range), can be used; for example, in place of use of projections 55, the surface of first pivot 21 may be formed in an elliptic configuration, etc., to obtain the same operational effects. Here, in the present embodiment, projections 55, or projections 55 and rear edge 69*a* of pillar 65 are formed so that the display may be inclined at a tilt angle of about 10 degrees from the direction perpendicular to the mounted surface of display unit 1.

[Grip Handle 17*b*]

In order to carry display unit 1 easily, a grip handle 17*b* is provided. Any configuration will work as this grip handle 17*b* as long as it can be gripped. In the present embodiment, in order to ease joining and separation between pillar 65 and stand-cum-joint 57, grip handle 17*b* is designed to be less inclined relative to fixing portion 19 than grip handle 17 is. This prevents swaying of display unit 1 when grip handle 17*b* is held, hence makes it possible to smoothly change the way of usage between the first and second usage modes.

In addition, circular grip handle 17*b* is convenient for carriage and wall-mounting, rectangular and triangular grip handles, however, are also suitable for carrying and wall-mounting, respectively.

[Pillar 65]

Roughly specking, pillar 65 differs from pillar 37 of the second embodiment, in the shape of the upper face designated at 69, the shape of an insert space 71, provision of an opening/closing lid 73, an anti removal device 77 of stand-cum-joint 57 and the like (FIGS. 20 to 24).

Upper face 69 of pillar 65 is formed becoming gradually higher from the screen side of display unit 1 toward the backside, so as to mate with the underside of first pivot 21. This configuration is able to reduce the gap between pillar 65 and first pivot 21 in the first usage mode and hence produce in appearance a sense of unity of the separable display unit 1 side and the pillar 65 side, making success in design. Additionally, in a case where projections 55 come into contact with upper face 69 when stand-cum-joint 57 is inserted into pillar 65, upper face 69 and the undersurface of first pivot 21 do not mate with each other, forming gaps, which helps the user to recognize occurrence of an improper insertion.

Figure 22:
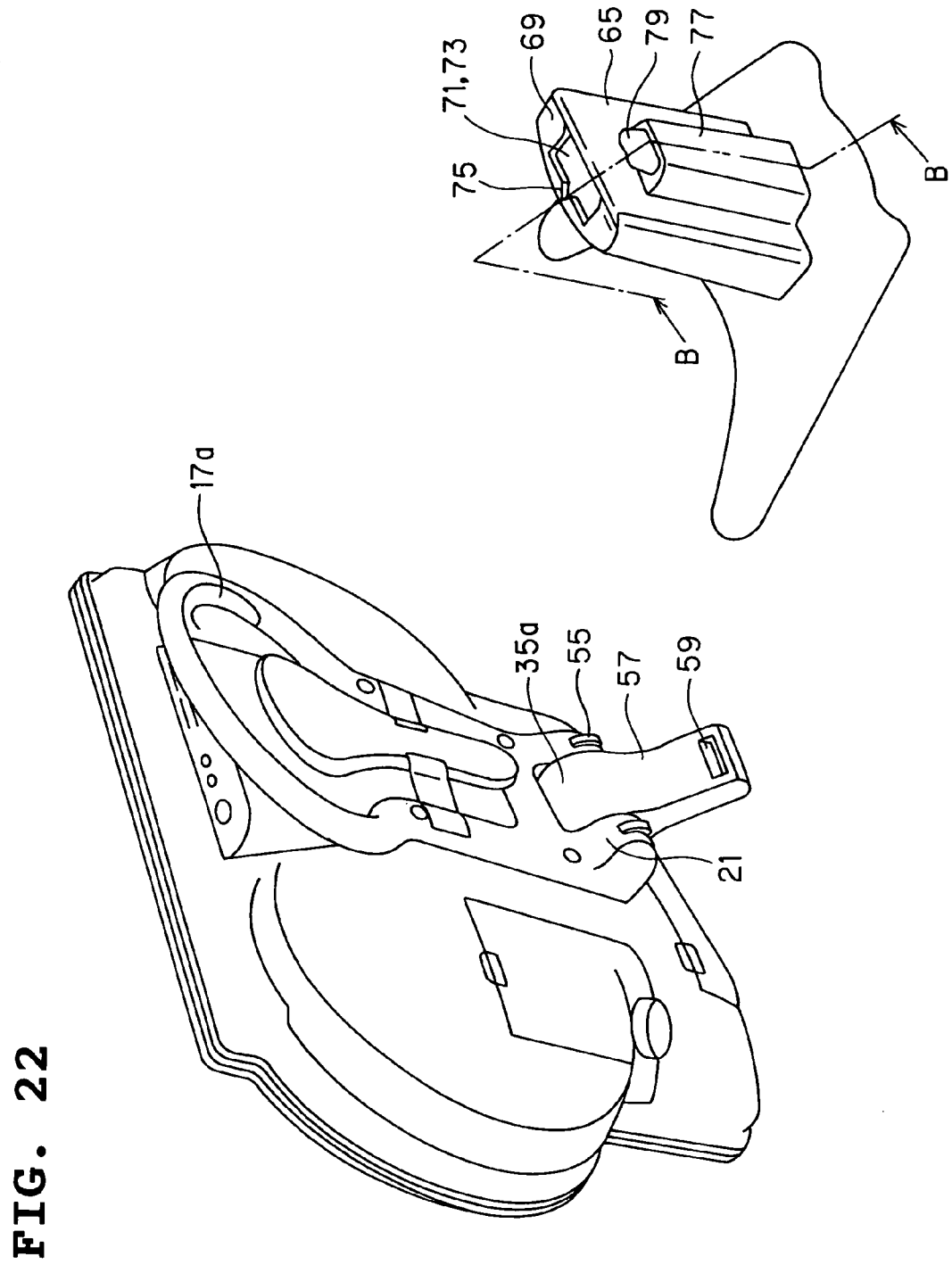
FIG. 22 is a perspective view for explaining the second usage mode of a stand type thin design television according to the third embodiment of the present invention.

Insert space 71 is a hole into which stand-cum-joint 57 is inserted, and has a shape approximately similar to the sectional shape of stand-cum-joint 57 with restraint projection 61, cut on a plane perpendicular to the direction of insertion (FIG. 22).

[Interference Protector]

Cushioning members 72*a* and 72*b*, made up of block-like, bar-like and/or plate-like rubber, plastic, silicone or the like as the interference protectors for keeping a predetermined gap with stand-cum-joint 57 are provided in insert space 71, at positions above the midpoint of the length of insert space 71 or closer to the opening side. Cushioning members 72*a* and 72*b* may be provided annularly or partially with respect to the directions perpendicular to insertion. Since stand-cum-joint 57 fitted in insert space 71 is supported inside insert space 71, with the side of its shaft abutted by cushioning members 72*a* and 72*b* and the distal end abutted by non-skid/cushioning member 35*b*, it is possible to reduce uncomfortable shaking of display unit 1 relative to pillar 67 and generation of noise due to interference.

Further, when the portion, designated at 89, in insert space 71 opposing non-skid/cushioning member 35*b* of stand-cum-joint 57 or its vicinity is formed of a magnet while the non-skid/cushioning member 35*b* is formed of metal, the distal end of stand-cum-joint 57 can be attracted to the magnet at the bottom of insert space 71 in the first usage mode, hence it is possible to reduce uncomfortable shaking of stand-cum-joint 57 inside pillar 67 and generation of noise due to interference.

[Lid Member 73]

Figure 23:
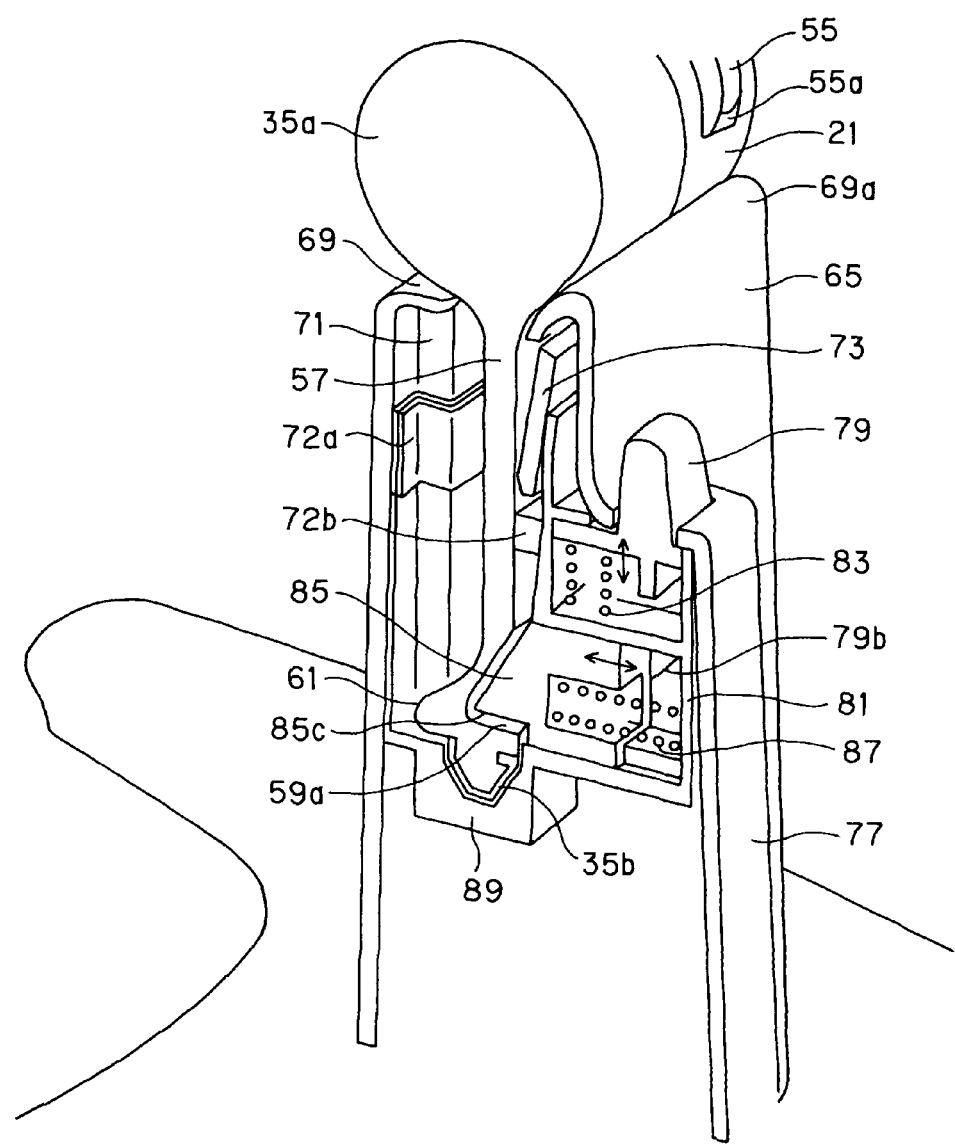
FIG. 23 is a perspective cutaway view cut along a plane B-B in FIG. 22.

Opening/closing lid 73 is a lid member that is hinged at its one side by the top inside insert space 71 and is continuously urged in the direction it closes the opening of insert space 71 (FIGS. 22 and 23). Since opening/closing lid 73 closes the opening of insert space 71 in the second usage mode, it is possible to avoid entering dirt into insert space 71.

[Anti-removal Device on the Pillar Side]

FIG. 23 is a perspective cutaway view cut along a plane B-B in FIG. 22; FIG. 24 is a perspective view showing the part of an anti removal device 77 in FIG. 23, viewed from the rear side; and FIG. 25 is a perspective view for explaining the operation of anti removal device 77 when an actuator 79 is pressed from the state shown in FIG. 24.

As shown in FIG. 23, anti removal device 77 comprises: user actuator 79; a latching/unlatching part 85 which, in the first usage mode, is inserted into and meshed with anti removal hollow 59 (FIG. 20) and comes out from the anti removal hollow 59 by the operation (pressing, for example) of actuator 79 so as to disengage the meshing; a frame 81 for housing actuator 79 and latching/unlatching part 85 and allowing them to reciprocate; and springs 83 and 87 for respectively urging actuator 79 and latching/unlatching part 85 outwards from the interior of frame 81.

Actuator 79 has an operating button that is rounded at edges with a concavity at its center in order to produce a greater contact area with a finger so as to disperse its pressing force. The portion, of latching/unlatching part 85, to be inserted into anti removal hollow 59 has an approximately triangular prim-like shape similar to the shape of anti removal hollow 59. Sliding movement of actuator 79 and that of latching/unlatching part 85 inside frame 81 are approximately perpendicular to each other, so that the directions of urging of springs 83 and 87 are also approximately perpendicular to each other.

As shown in FIG. 24, one side wall of frame 81 is formed with a first guide slot 81*a* for guiding actuator 79 in its moving direction and a second guide slot 81*b* for guiding latching/unlatching part 85 in its moving direction, and a guide projection 79*a* of actuator 79 is engaged with the first guide slot 81a and a link rod 85a of latching/unlatching part 85 is engaged with the second guide slot 81b, respectively in a reciprocating manner.

Actuator 79 has a link slope 79b as an inclined surface for pressing and moving link rod 85a along second guide slot 81b with the movement of actuator 79.

In the above arrangement, when grip handle 17b is drawn up with stand-cum-joint 57 coupled with pillar 65 (FIG. 23), a first abutment 85c of latching/unlatching part 85 and an opposing, second abutment 59a of anti removal hollow 59 of stand-cum-joint 57 interfere with each other, so that pillar 67 and stand base 45 can be lifted together to permit movement in the first usage mode.

When usage is shifted to the second usage mode, pressing actuator 79 opposing the urging force of spring 83, as shown in FIGS. 24(a) and 24(b), causes link slope 79b to press link rod 85a while guide projection 79a moves within first guide slot 81a, whereby link rod 8 a moves rearwards (in the direction in which latching/unlatching part 85 is pulled out from anti removal hollow 59) within second guide slot 81d, simultaneously, latching/unlatching part 85 having the link rod 85a moves rearwards opposing spring 87, and latching/unlatching part 85 is withdrawn from anti removal hollow 59. Thus, when grip handle 17b is pulled up while actuator 79 is being pressed in the insertional direction H1 of stand-cum-joint 57 being inserted, stand-cum-joint 57 is pulled out from pillar 67, while first abutment surface 85c of latching/unlatching part 85 does not interfere with second abutment surface 59a. At this moment, since force is applied and directed in the direction H2 in which stand-cum-joint 57 is removed from the stand/pillar structure by pulling up grip handle 17b while lifting of the pillar portion is held back by the applied force on actuator 79 in the insertional direction H1 of stand-cum-joint 57, hence the application of the force in the opposite direction enables easy and stable detachment.

[Indicating Device]

FIG. 25 shows a sound generator 91 for first pivot 21 (FIG. 20) and rotational part 35a of stand-cum-joint 57, as one example of indicating device of recommended angles of elevation of display unit 1.

Sound generator 91 comprises: a roller 93 that is rotatably arranged in an long hole 22c (FIG. 25(b)) formed in a bearing portion 22 fixed to first pivot 21; a plate-like roller receiver 95 having cutouts 94a and 94b to be engaged with the roller 93; and an urging means 97 constantly urging the roller 93 to the roller receiver 95 side.

Bearing portion 22 has a fixture face 22a to be fixed to first pivot 21 by screws, etc., a flat pivot 22b for axially supporting a rotational shaft 36 of rotational part 35a, and long hole 22c for rotatably holding roller 93 in the flat pivot 22b.

Long hole 22c is located close to a bearing 22d of rotational shaft 36 and opposing cutouts 94a and 94b, and loosely holds roller 93 with a proper gap with respect to its minor axis. Movement of roller 93 in the longitudinal direction of long hole 22c is limited at one side by bearing 22d and at the other side by a proximal portion 97a of urging means 97. Here, long hole 22c may and should be sized and configured so as to at least permit roller 93 to move in the direction of urging by the urging force of urging mans 97.

Roller 93 used here is spherical, but the roller may be of a rotatable shape, e.g., cylindrical shape and conical shape. Roller 95 is formed of metal, but may be formed of any material such as metal, resin, etc., taking into account the contact sound with roller receiver 95 during rotation, and the indication sound when engaged with cutout 94a or 94b.

Roller receiver 95 is a plate-like element projected as a flange from rotational shaft 36 axially supported on flat pivot 22b and has annular cutouts 94a and 94b positioned equidistant from the rotational shaft 36. Roller receiver 95 is formed in a flat plate-like form but may be formed with a guide rail for roller 93 at the area where it abuts roller 93. This functions as guide in the moving direction of roller 93 with respect to roller receiver 95, hence enabling smooth rotation. Here, the guide rail may be formed by, for example, a groove having a width that can guide roller 93.

Cutouts 94a and 94b are formed with an opening that will not permit the roller 93 to pass through, and shaped annularly having a diameter smaller than that of roller 93 in order to enhance the stability of roller 93 fitted therein, and having an effect of centering of roller 93. Further, the opening rims of cutouts 94a and 94b are formed with a curved surface (contact surface) 94c fitting the roller 93, so as to enhance the stability and centering effect of roller 93 meshing cutouts 94a and 94b.

Cutout 94a is formed at such a position as to oppose roller 93 when, in switching usage from the second usage mode to the first usage mode, stand-cum-joint 57 is set at a recommended angle for joining itself to pillar 65, or set approximately parallel (at an angle of about 0 degree) relative to display unit 1. Cutout 94b is formed at such a position as to oppose roller 93 when, in the second usage mode, display unit 1 is set at a recommended angle, e.g., the display screen of display unit 1 is tilted at about 15 degrees relative to the direction perpendicular to the mounted surface. It should be noted that the number and positions of cutouts are not limited to the above configuration, it is possible to select any positions depending on the events which should be indicated to the user as recommended angles.

Urging means 97 constantly urges roller 93 toward the roller receiver 95 side, and is fixed at proximal portion 97a to flat pivot 22b on its roller receiver 95 side with screws and turned back in a U-shape at the edge of flat pivot 22b so that the flat surface 97b in the vicinity of the free end presses roller 93 against roller receiver 95 with a predetermined urging force.

In the above arrangement, as stand-cum-joint 57 is pivoted from the state where roller 93 is engaged with cutout 94a, rotational shaft 36 and roller receiver 95 rotate together opposing the urging force acting on roller 93 from urging means 97 and the centering force acting between roller 93 and cutout 94a, and roller 93 rolls on the flat surface of roller receiver 95. As roller 93 rolls, and when it fits and becomes engaged with curved surface 94c of cutout 94b, an indication sound or "click" indicating a recommended angle arises from the urging force from urging means 97 and the centering force between roller 93 and cutout 94b. Thus, the user is given notice of a recommended angle, hence is able to comprehend safe usage positions. This results in a user-friendly apparatus. Similarly, in the case of rotation from cutout 94b to cutout 94a, the user is able to know the angle of stand-cum-joint 57 to be inserted into pillar 65 from the indication sound or "click" indicating a recommended angle, hence recognize the fact of safe set position.

Here, urging means 97 is not limited to a leaf spring, but an elastic member, e.g., rubber, which continuously presses roller 93 against roller receiver 95 may be used.

Additionally, the indicating device here was described by taking a configuration that aurally informs the user of a recommended angle, for example, sound generator 93, but it should not be limited to this configuration as long as it can produce a sound with change of the angle. It is also possible to obtain the same effect by informing the user of the recommended angle with a visual method using, for example, light emitting devices, light-emitting members, instead of indication sound.

It also goes without saying that the same operational effects can be obtained by applying the third embodiment to the configuration of the first embodiment.

Next, the case in which the battery incorporated in the display unit is charged in the first usage mode will be described hereinbelow as the fourth embodiment. Here, the fourth embodiment will be described referring mainly to the differences from the third embodiment.

The Fourth Embodiment

In a stand-cum-joint 57b of the present embodiment, as shown in FIG. 26, a connector portion C1 that is electrically connected to battery 11 incorporated in display unit 1 is formed as part of non-skid/cushioning member 35b of the stand-cum-joint 57 of the third embodiment.

Connector portion C1 of the present embodiment has a contact with an after mentioned connector portion C2, exposed from non-skid/cushioning member 35b. The configuration of the contact is not particularly limited; flat-shaped, female pin type or any other type contact can be used.

A lead wire L is connected from connector C1, passing through the interior of stand-cum-joint 57 to battery 11.

On the stand/pillar structure 65b which is the power supply side to connector C1, connector portion C2 is arranged at such a position in the opposing portion 89 of the third embodiment as to oppose the connector portion C1, whereby electric connection with the connector portion C1 is established in the first usage mode.

The connector portion C2 is connected to a d.c. power supply unit (including an AC-DC converter) P2 for converting a.c. current from an a.c. power source plug P1 into d.c. current.

Accordingly, in the first usage mode, when power source plug P1 is inserted into an unillustrated plug socket, the d.c. current from power supply unit P2 is supplied to battery 11 by way of connector portion C2, connector portion C1 and lead wire L.

With the above configuration, in the second usage mode it is possible to carry only display unit 1 and operate it with the power supply from battery 11, at another location to which the display is carried. In the first usage mode, while battery 11 provided in display unit 1 is charged, display unit 1 can be used for display purposes, thus making it possible to provide improved usage convenience. It goes without saying that current from d.c. power supply unit P2 can be supplied not only for charging of battery 11 but also for power supply to display unit 1 itself.

Also, the positions of attachment of connector portions C1 and C2 and their shapes, etc., are not limited as long as the positions, shapes, etc., are designed to establish electric connection in the first usage mode.

As has been described heretofore, according to the present invention, without limitation of the mounting space, the display unit can be efficiently used in various usage modes such that the display may be mounted in a narrow place or moved to a table top or wall-mounted, thus it is possible to provide a highly versatile display apparatus.

INDUSTRIAL APPLICABILITY

The thin design display apparatus and display unit detachment method according to the present invention can be suitably applied to the thin design display apparatus which can be used in various usage modes, in which the display may be mounted at a narrow place or moved to a table top or wall-mounted, without limitation of its mounting location.

The invention claimed is:

1. A thin design display apparatus comprising:
a stand/pillar structure having an insert space and a stand base portion formed so as to be placed in contact with a flat plane,
a thin type display unit including a battery; and
a fitting part on the thin type display unit;
wherein the fitting part is connected to the display unit by a rotatable rotation part, and
wherein the thin type display unit is supported by the stand/pillar structure in a first usage mode, by inserting the fitting part into the insert space, and is removable by pulling out the fitting part to separate the display unit from the stand/pillar structure for support of the thin type display unit on both of a bottom surface of the thin type display unit and a distal end of the fitting part on the same flat plane in a second usage mode; and
wherein rotation of the fitting part adjusts an angle of elevation of the thin type display unit in the first usage mode and the second usage mode.

2. A thin design display apparatus comprising:
a stand/pillar structure having an insert space and a stand base portion formed so as to be placed in contact with a flat plane,
a thin type display unit including a battery; and
a fitting part on the thin type display unit;
wherein the thin type display unit is supported by the stand/pillar structure in a first usage mode, by inserting the fitting part into the insert space,
wherein the display unit includes a grip handle which can be gripped,
wherein the fitting part of the display unit can be pulled out and removed from the stand/pillar structure and the fitting part supports the display unit on both of a bottom surface of the display unit and a distal end of the fitting part on the same flat plane in a second usage mode; and
wherein an anti removal device for preventing removal of the fitting part and a removal prevention releasing device for canceling the removal prevention against the fitting part by the anti removal device are included.

3. A thin design display apparatus according to claim 1, wherein a front end of the fitting part with respect to an insertional direction is formed with an elastic member.

4. A thin design display apparatus according to claim 2, wherein the removal prevention releasing device releases removal prevention of the fitting part by a force acting in the same direction as the fitting part is inserted into the stand/pillar structure to permit separation of the fitting part from the stand/pillar structure.

5. The thin design display apparatus according to claim 1, wherein the display unit has a grip handle that can be gripped.

6. The thin design display apparatus according to claim 1, wherein the stand/pillar structure includes a stand base portion formed so as to be placed in contact with a flat plane and a pillar portion provided upright on the stand base portion, having the insert space; and the pillar portion is able to be rotatable relative to the stand base about an axis that is perpendicular to the flat plane.

7. The thin design display apparatus according to claim 1, wherein the display unit incorporates a battery in a lower side.

8. A thin design display apparatus comprising:
a thin type display unit having a battery and a stand-cum-joint; and
a stand/pillar structure having an insert space and a stand base portion formed so as to be placed in contact with a flat plane and, wherein the thin type display unit is supported by the stand/pillar structure, by inserting the stand-cum-joint into the insert space, wherein the display apparatus has a first configuration in which the display unit is supported by the stand/pillar structure, wherein the display apparatus has a second configuration in which the stand-cum-joint of the display unit is disconnected from the stand/pillar structure to provide a stand for supporting the display unit on both of a bottom surface of the stand/pillar structure and a distal end of the stand-cum-joint on the same flat plane, and wherein the length of the stand-cum-joint is such as to stably support the thin type display unit in the second configuration.

9. The thin design display apparatus according to claim 8, wherein a backside of the display unit and one end of the stand-cum-joint are connected by a rotational part that makes them rotatable.

10. The thin design display apparatus according to claim 9, wherein a rotational axis of the rotational part extends parallel to a width direction of the display unit, and the stand-cum-joint is rotatable about the rotational axis from a position where a distal end is located on a bottom side of the display unit to a position where the distal end is located on a top side.

11. The thin design display apparatus according to claim 9, further comprising an indicating means for informing a user of a fact that a pivot angle between the display unit and the stand-cum-joint is set at a recommended angle of elevation.

12. The thin design display apparatus according to claim 9, wherein the stand-cum-joint projects down below a bottom side of the display unit when a distal end of the stand-cum-joint is set at a downmost position on the bottom side of the display unit.

13. The thin design display apparatus according to claim 9, wherein a cross section of a distal end of the stand-cum-joint is an elongate shape which is longer in a direction of a rotational axis than in a direction perpendicular to the rotational axis.

14. The thin design display apparatus according to claim 8, wherein a cross section of the stand-cum-joint and the insert space of the stand-cum-joint are circular.

15. The thin design display apparatus according to claim 8, wherein the stand/pillar structure is further comprised of an anti removal device for preventing removal of the stand-cum-joint and a removal prevention releasing device for canceling the removal prevention against the stand-cum-joint by the anti removal device.

16. The thin design display apparatus according to claim 8, wherein one of the stand-cum-joint and the insert space of the stand/pillar structure has a recess and the other has a projection so as to guide an insertional direction and removal by a cooperation of the stand-cum-joint and the insert space of the stand/pillar structure.

17. The thin design display apparatus according to claim 8, wherein a cushioning member that prevents the stand-cum-joint from swaying in the first configuration mode is provided inside the insert space of the stand/pillar structure.

18. The thin design display apparatus according to claim 8, wherein the distal end of the stand-cum-joint is formed with an elastic member.

19. The thin design display apparatus according to claim 8, wherein the display unit has a grip handle that can be gripped.

20. The thin design display apparatus according claim 19 wherein the grip handle has a fixture portion to be fixed to the display unit and a remote controller holder for holding a remote controller for remote controlling the display unit in the fixture portion.

21. The thin design display apparatus according to claim 19, wherein the grip handle and the stand-cum-joint are formed in an integral manner as a joined structure that can be connected to the display unit.

22. The thin design display apparatus according to claim 8, wherein the stand/pillar structure includes a stand base portion formed so as to be placed in contact with a flat plane and a pillar portion provided upright on the stand base portion, having the insert space; and the pillar portion is able to be rotatable relative to the stand base about an axis that is perpendicular to the flat plane.

23. The thin design display apparatus according to claim 8, wherein the display unit has a remote controller holder for holding a remote controller for remote controlling display of the display unit.

24. The thin design display apparatus according to claim 8, further comprising a pair of semicircular speaker portions on the left and right of the display unit.

25. The thin design display apparatus according to claim 8, wherein the display unit incorporates a battery in a lower side.

26. A thin design display apparatus comprising:
a thin type display unit;
a grip handle; and
a stand-cum-joint having one end which is connected to a backside of the display unit by means of a rotatable rotational part, wherein the display unit is supported by a stand/pillar structure, by inserting the stand-cum-joint into an insert space of the stand/pillar structure, wherein the display apparatus has a first configuration in which the display unit is supported by the stand/pillar structure, wherein the display apparatus has a second configuration in which the stand-cum-joint of the display unit is pulled out from the stand/pillar structure to provide a stand for supporting the display unit, and wherein the display apparatus has a third configuration in which the stand-cum-joint of the display unit is pulled out from the stand/pillar structure and the grip handle is engaged with a projection projected from a wall surface.

27. A display unit detaching method, wherein a thin type display unit having a grip handle and a fitting part is removably supported by a stand/pillar structure, by inserting the fitting part into an insert space of the stand/pillar structure, and removal of the fitting part is prevented by an anti removal device and the prevention of the removal of the fitting part is canceled by an operation to an actuator, comprising the steps of:

pulling up the grip handle so as to cause a force to act in the vertical upward direction in which the fitting part is separated from the stand/pillar structure, and at the same time, applying a force by the operation to the vertical downward direction on the actuator in the same direction as the fitting part is inserted into the stand/pillar structure, so as to detach the fitting part of the display unit from the stand/pillar structure, and applying a force to the fitting part to adjust the angle of the fitting part with respect to the display unit to provide stable support when separated.

28. A thin design display apparatus comprising:
a thin type display unit including a battery;
a fitting part pivotably mounted on the thin type display unit; and a removable stand structure having an insert space adapted to slidingly, removably receive the fitting part, the stand structure supporting the thin type display unit when the fitting part is in the insert space, wherein the stand structure has a stand base portion formed so as to be placed in contact with a flat plane, and wherein pivoting of the fitting part permits adjustment of the angle of the thin type display unit when the thin type display unit is supported by the stand structure and when the thin type display unit is supported on a distal end of the fitting part and a bottom surface of the thin type display unit on the flat plane.

29. The thin design display apparatus of claim 28 including a grip handle on the thin type display unit.

30. The thin design display apparatus of claim 28 including an elastic member on at the second portion of the fitting part.

31. The thin design display apparatus of claim 28 including a removal prevention device for selectively preventing removal of the fitting part from the insert space.

32. The thin design display apparatus of claim 28 wherein said stand structure comprises a base and a pillar projecting from said base.

33. The thin design display of claim 31 wherein said stand structure comprises a base and a pillar projecting from said base and including an actuator shiftable toward and away from said base, said actuator moving said removal prevention device to a releasing potion when shifted toward said base.

34. The thin type display of claim 28 wherein said fitting part includes an opening and said stand structure includes a projection adapted to project into the opening in the fitting part when the fitting part is inserted in the insert space.

35. The thin type display of claim 34 including a release actuator for moving said projection out of said opening, said release actuator being movable in a direction parallel to a longitudinal axis of said fitting part.

36. A method comprising the steps of:
providing a thin type display unit having a fitting part pivotably mounted on the thin type display unit, the thin type display unit having a peripheral edge;
providing a stand having an insert space;
inserting the fitting part into the insert space so that the thin type display unit is supported by the stand;
separating the thin type display unit from the stand;
pivoting the fitting part to a first position with respect to the thin type display unit; and
placing the thin type display on a horizontal surface so that the thin type display is supported by the peripheral edge and the fitting part.

37. The method of claim 36 including the additional steps of:
pivoting the fitting part to a second position with respect to the thin type display; and
hanging the thin type display on a projection on a vertical surface.

* * * * *